(12) United States Patent
Nishihara et al.

(10) Patent No.: US 11,576,032 B2
(45) Date of Patent: Feb. 7, 2023

(54) COMMUNICATION SYSTEM AND POLICY CONTROL DEVICE

(71) Applicant: Nippon Telegraph and Telephone Corporation, Tokyo (JP)

(72) Inventors: Hidetaka Nishihara, Tokyo (JP); Hiroki Iwahashi, Tokyo (JP); Kaori Kurita, Tokyo (JP); Kazuhiro Matsuo, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/280,968

(22) PCT Filed: Oct. 10, 2019

(86) PCT No.: PCT/JP2019/040013
§ 371 (c)(1),
(2) Date: Mar. 29, 2021

(87) PCT Pub. No.: WO2000/090407
PCT Pub. Date: May 7, 2020

(65) Prior Publication Data
US 2021/0360380 A1   Nov. 18, 2021

(30) Foreign Application Priority Data

Oct. 31, 2018 (JP) .............................. JP2018-205209

(51) Int. Cl.
*H04W 8/00* (2009.01)
*H04W 8/18* (2009.01)
(Continued)

(52) U.S. Cl.
CPC ............... *H04W 8/18* (2013.01); *H04W 8/22* (2013.01); *H04W 88/18* (2013.01); *H04W 76/14* (2018.02)

(58) Field of Classification Search
None
See application file for complete search history.

(56) References Cited

U.S. PATENT DOCUMENTS

2012/0101952 A1* 4/2012 Raleigh ............... H04L 12/1417
709/223
2013/0132854 A1* 5/2013 Raleigh ................. H04M 15/77
715/738
2015/0319313 A1* 11/2015 Lifshitz ................... H04W 4/24
455/406

FOREIGN PATENT DOCUMENTS

JP        2016-146516        8/2016

OTHER PUBLICATIONS

[No Author Listed], "3GPP TS 23.203 V15.4.0," 3GPP A Global Initiative, Sep. 2018, 261 pages.
(Continued)

*Primary Examiner* — Jinsong Hu
*Assistant Examiner* — Alexander J Yi
(74) *Attorney, Agent, or Firm* — Fish & Richardson P.C.

(57) ABSTRACT

A policy and charging rules function (PCRF) stores a policy rule management table in which a policy rule corresponding to a combination of contract information and a device type is registered and a hierarchical management table in which user information including contract information of a user and information on the device are managed in association with each other, acquires the device type serving as an application target of the policy rule, and a device ID assigned to the device, determines the policy rule according to the acquired device type and the contract information of the user, and instructs a deep packet inspection (DPI) to apply the determined policy rule to the device corresponding to the acquired device ID. The DPI acquires the device ID,
(Continued)

and applies the policy rule to communication from the device corresponding to a device ID assigned to the device, and performs control.

5 Claims, 24 Drawing Sheets

(51) Int. Cl.
    *H04W 8/22*     (2009.01)
    *H04W 88/18*     (2009.01)
    *H04W 76/14*     (2018.01)

(56) References Cited

OTHER PUBLICATIONS

Noguchi et al., "IoT Device Identification Based on Similarity Analysis of Communication," IEICE Technical Report, 2018, 118(124):51-56, 13 pages (with English Translation).

Omotani et al., "Edge router system that realizes flexible service distribution," NTT Technology Journal, Feb. 2016, pp. 79-83, 11 pages (with English Translation).

\* cited by examiner

| DEVICE ID | DEVICE TYPE |
|---|---|
| DEVICE ID_1 | MICROPHONE |
| DEVICE ID_2 | CAMERA |
| | |
| | |

| DEVICE TYPE | POLICY RULE |
|---|---|
| MICROPHONE | MICROPHONE RULE |
| CAMERA | CAMERA RULE |
| TV | TV RULE |

| CONTRACT ID | SESSION ID | APPLIED POLICY RULE |
|---|---|---|
| CONTRACT ID_1 | SESSION ID_1 | DEFAULT RULE |
| CONTRACT ID_2 | SESSION ID_2 | GOLD RULE |

| DEVICE ID | SESSION ID | APPLIED POLICY RULE |
|---|---|---|
| DEVICE ID_1 | SESSION ID_3 | MICROPHONE RULE |
| DEVICE ID_2 | SESSION ID_4 | CAMERA RULE |
| DEVICE ID_3 | SESSION ID_5 | TV RULE |

| CONTRACT ID | CONTRACT SERVICE | DEVICE ID | DEVICE TYPE |
|---|---|---|---|
| CONTRACT ID_1 | DEFAULT | DEVICE ID_1 | MICROPHONE |
| CONTRACT ID_1 | DEFAULT | DEVICE ID_2 | CAMERA |
| CONTRACT ID_2 | GOLD PLAN | DEVICE ID_3 | TV |

| POLICY RULE NAME | CONTROL CONTENT |
|---|---|
| MICROPHONE RULE | BEST EFFORT |
| CAMERA RULE | PRIORITY CONTROL |
| TV RULE | HIGH BANDWIDTH ALLOCATION |
| DEFAULT RULE | BEST EFFORT |
| GOLD RULE | PRIORITY CONTROL AND HIGH BANDWIDTH ALLOCATION |

Fig. 11

| VLAN ID | NW INFORMATION | | DEVICE ID | SESSION ID | APPLIED POLICY RULE |
| --- | --- | --- | --- | --- | --- |
| | IP ADDRESS | PORT NUMBER | | | |
| VLAN_ID_1 | IP ADDRESS_1 | PORT NUMBER_1 | - | SESSION ID_1 | DEFAULT RULE |
| VLAN_ID_2 | IP ADDRESS_2 | PORT NUMBER_2 | - | SESSION ID_2 | GOLD RULE |
| VLAN_ID_1 | IP ADDRESS_3 | PORT NUMBER_3 | DEVICE ID_1 | SESSION ID_3 | MICROPHONE RULE |
| VLAN_ID_1 | IP ADDRESS_4 | PORT NUMBER_4 | DEVICE ID_2 | SESSION ID_4 | CAMERA RULE |
| VLAN_ID_2 | IP ADDRESS_5 | PORT NUMBER_5 | DEVICE ID_3 | SESSION ID_5 | TV RULE |

Fig. 12

| CONTRACT ID | DEVICE ID | DEVICE TYPE | SESSION ID | APPLIED POLICY RULE |
|---|---|---|---|---|
| CONTRACT ID_1 | - | - | SESSION ID_1 | DEFAULT RULE |
| | DEVICE ID_1 | MICROPHONE | SESSION ID_3 | MICROPHONE RULE |
| | DEVICE ID_2 | CAMERA | SESSION ID_4 | CAMERA RULE |
| CONTRACT ID_2 | - | - | SESSION ID_2 | GOLD RULE |
| | DEVICE ID_3 | TV | SESSION ID_5 | TV RULE |

Fig. 20

| CONTRACT SERVICE | DEVICE TYPE | POLICY RULE |
|---|---|---|
| DEFAULT | MICROPHONE | MICROPHONE RULE 1 |
| | CAMERA | CAMERA RULE 1 |
| | TV | TV RULE 1 |
| GOLD PLAN | MICROPHONE | MICROPHONE RULE 2 |
| | CAMERA | CAMERA RULE 2 |
| | TV | TV RULE 2 |

| CONTRACT ID | CONTRACT SERVICE | DEVICE ID | DEVICE TYPE | SESSION ID | APPLIED POLICY RULE |
|---|---|---|---|---|---|
| CONTRACT ID_1 | DEFAULT | - | - | SESSION ID_1 | DEFAULT RULE |
| | | DEVICE ID_1 | MICROPHONE | SESSION ID_3 | MICROPHONE RULE 1 |
| | | DEVICE ID_2 | CAMERA | SESSION ID_4 | CAMERA RULE 1 |
| CONTRACT ID_2 | GOLD PLAN | - | - | SESSION ID_2 | GOLD RULE |
| | | DEVICE ID_3 | TV | SESSION ID_5 | TV RULE 2 |

Fig. 25

COMMUNICATION SYSTEM AND POLICY CONTROL DEVICE

CROSS-REFERENCE TO RELATED APPLICATIONS

This application is a National Stage application under 35 U.S.C. § 371 of International Application No. PCT/JP2019/040013, having an International Filing Date of Oct. 10, 2019, which claims priority to Japanese Application Serial No. 2018-205209, filed on Oct. 31, 2018. The disclosure of the prior application is considered part of the disclosure of this application, and is incorporated in its entirety into this application.

TECHNICAL FIELD

The present invention relates to a communication system and a policy control device.

BACKGROUND ART

In recent years, Internet of Things (IoT) devices connected to a network, such as network cameras or televisions, have been becoming more diverse. In the 5G/IoT era, it is assumed that IoT devices connected to a network will become more diverse (cameras, sensors, and the like) and policy rules required for each device will also become more diverse. For example, a policy rule or the like for controlling a video of a surveillance camera preferentially over other devices can be considered.

CITATION LIST

Patent Literature

Patent Literature 1: JP 2016-146516 A

Non Patent Literature

Non Patent Literature 1: Hirofumi Noguchi et al., "IoT Device Identification Based on Similarity Analysis of Communication", IEICE Technical Report, vol. 118, no. 124, NS2018-45, pp. 51-56, July 2018
Non Patent Literature 2: Masaaki Omotani (et al.), "Edge Router System that Distributes Traffic Flexibility According to Services", NTT technical journal 2016.2.
Non Patent Literature 3: 3GPP TS 23.203 V15.4.0 (2018-09)

SUMMARY OF THE INVENTION

Technical Problem

FIGS. 28 to 30 are diagrams illustrating a policy rule application process according to the related art. In the related art, 3GPP defines a model in which a policy and charging rule function (PCRF) instructs a policy and charging enforcement function (PCEF) to perform policy control, as illustrated in FIG. 28. Specifically, the PCRF instructs on application of a policy rule (see (1) of FIG. 28), and the rule is applied in a PCEF/deep packet inspection (DPI) (see (2) of FIG. 28).

Further, in HTTP communication, a device type of each device is identified in deep packet inspection (DPI) from information stored in User-Agent in an HTTP header in order to realize flexible policy control according to an IoT device type (for example, a camera or a TV). Specifically, when a server of a service provider receives the HTTP request from the device (see (1) in FIG. 29), the DPI identifies the device type from the User-Agent in the HTTP header (see (2) in FIG. 29). The PCRF that has received a device type identification result (see (3) in FIG. 29) from the DPI instructs the DPI to apply a policy rule corresponding to the identified device type (see (4) in FIG. 29), and the DPI applies the policy rule provided through the instruction to the identified device (see (5) in FIG. 29). Thus, the PCRF acquires a DPI device identification result to determine a policy rule according to each device type.

In recent years, in an HTTP request, server authentication or communication content encryption has generally been performed using an SSL/TLS protocol in order to prevent attacks such as spoofing, man-in-the-middle attacks, and eavesdropping and perform more secure communication.

However, there has been a problem where when the User-Agent of the HTTP request from the user is encrypted, the DPI cannot identify the device type and the PCRF cannot know the device type and determine the policy rule according to the device type. Specifically, even when the server of the service provider receives the HTTP request from the device (see (1) in FIG. 30), the DPI cannot identify the device type from the User-Agent in the HTTP header because the User-Agent is encrypted (see (2) in FIG. 30). As a result, the PCRF that cannot receive a device type identification result (see (3) in FIG. 30) from the DPI cannot instruct the DPI to apply a policy rule corresponding to the device type (see (4) in FIG. 30), and the DPI cannot apply the policy rule to the identified device (see (5) in FIG. 30).

Automatical identification of an IoT device from a flow and application of a different policy rule to each device will be required in a carrier network for the 5G/IoT era in the future. However, at present, it is not possible to identify a device that is a transmission source when an HTTP header is encrypted, and perform network policy control and management in units of devices.

The present invention has been made in view of the above circumstances, and an object of the present invention is to provide a communication system and a policy control device capable of realizing network policy control and management in device units.

Means for Solving the Problem

In order to solve the above-described problem and achieve the object, a communication system according to the present invention includes a policy control device configured to provide instruction on a policy rule for controlling communication of a device, and a relay device configured to relay communication of the device according to the policy rule provided through the instruction from the policy control device, wherein the policy control device includes a first storage unit configured to store a first table in which the policy rule corresponding to a combination of contract information and a device type is registered and a second table in which user information including contract information of a user and information on the device are managed in association with each other, a first acquisition unit configured to acquire the device type serving as an application target of the policy rule, and a device ID assigned to the device, and a determination unit configured to determine the policy rule according to the device type acquired by the first acquisition unit and the contract information of the user on the basis of content of the first table and the second table, and instruct the relay device to apply the determined policy rule to the device corresponding to the device ID acquired by the first acquisition unit, and the relay device includes a second storage unit configured to store a third table in which subscriber identification information, the device ID, and the network information of the device corresponding to the device ID are associated with each other, a second acquisition unit configured to acquire the device ID assigned to the device serving as the application target of the policy rule, and a communication control unit configured to refer to the third table, apply the policy rule provided through the instruction to communication from the device corresponding to the device ID assigned to the device to which the policy control device instructs to apply the determined policy rule, and perform control.

Further, a policy control device according to the present invention is a policy control device for providing instruction on a policy rule for controlling communication of a device, the policy control device including a storage unit configured to store a first table in which a policy rule corresponding to a combination of contract information and a device type is registered and a second table in which user information including contract information of a user and information on the device are managed in association with each other, an acquisition unit configured to acquire the device type serving as an application target of the policy rule, and a device ID assigned to the device, and a determination unit configured to determine the policy rule according to the device type acquired by the first acquisition unit and the contract information of the user on the basis of content of the first table and the second table, and instruct the relay device to apply the determined policy rule to the device corresponding to the device ID acquired by the acquisition unit.

Effects of the Invention

According to the present invention, network policy control and management can be realized in units of devices.

BRIEF DESCRIPTION OF DRAWINGS

FIG. 6 is a diagram illustrating an example of a data structure of a policy rule setting management table illustrated in FIG. 5.

FIG. 7 is a diagram illustrating an example of a data structure of a line-specific session management table illustrated in FIG. 5.

FIG. 8 is a diagram illustrating a data structure of a device-specific session management table illustrated in FIG. 5.

FIG. 9 is a diagram illustrating a data structure of a subscriber information management table illustrated in FIG. 5.

FIG. 11 is a diagram illustrating a data structure of a policy rule setting management table illustrated in FIG. 10.

FIG. 12 is a diagram illustrating a session management table illustrated in FIG. 10.

FIG. 20 is a diagram illustrating an example of a data structure of a table held by the PCRF illustrated in FIG. 1.

FIG. 25 is a diagram illustrating an example of a data structure of a hierarchical management table 2412 illustrated in FIG. 23.

DESCRIPTION OF EMBODIMENTS

Figure 1:
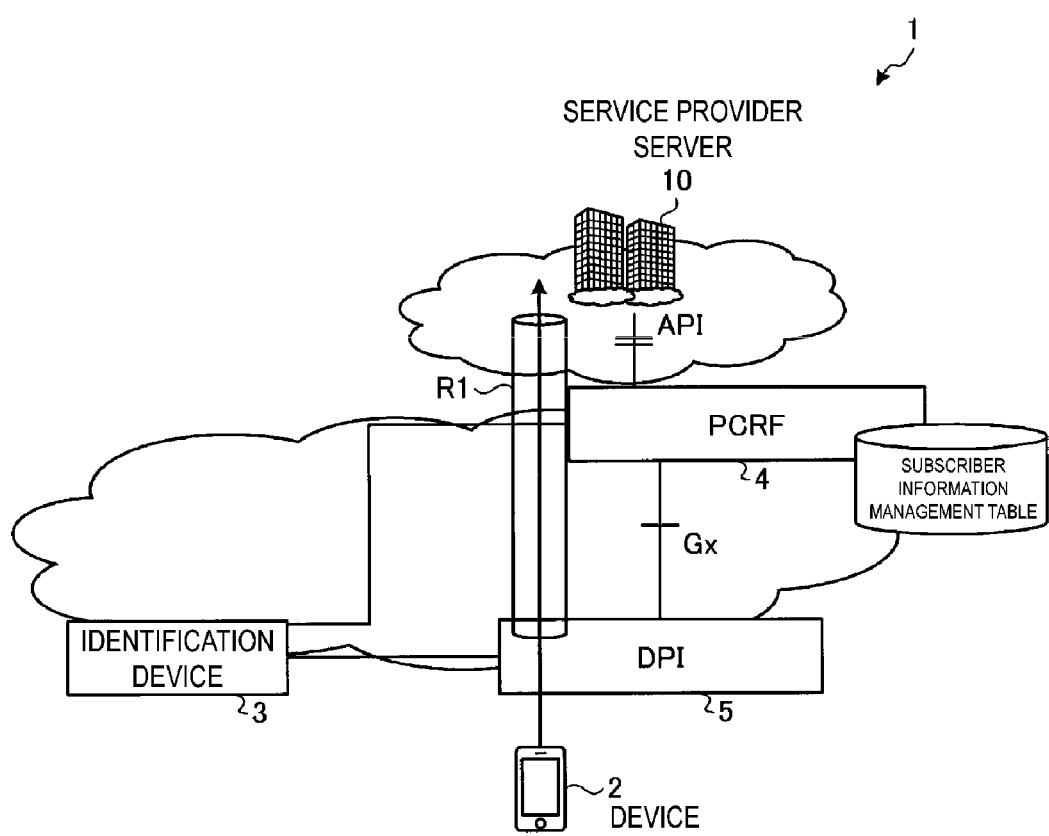
FIG. 1 is a diagram illustrating a schematic configuration of a communication system according to Embodiment 1.

Hereinafter, embodiments of the present invention will be described in detail with reference to the drawings. The present invention is not limited to the embodiments. Further, in description of the drawings, the same parts are denoted by the same reference numerals.

Embodiment 1

System Configuration

FIG. 1 is a diagram illustrating a schematic configuration of a communication system according to Embodiment 1. In a communication system 1 according to Embodiment 1, a device 2 and a service provider server 10 are communicatively connected via a DPI 5 (a relay device) on a network, as illustrated in FIG. 1. Further, the communication system 1 has a configuration in which a PCRF 4 (a policy control device) is connected to the DPI 5 and an identification device 3 is connected to the PCRF 4 and the DPI 5.

The device 2 is an IoT device. The device 2 is, for example, a communicable communication device provided in a camera, a microphone, a television, a thermometer, a lighting fixture, an air conditioner, or the like. The device 2 performs communication with the service provider server 10 via accommodated customer premises equipment (CPE), an IoT gateway, and a relay device DPI.

The identification device 3 compares a feature quantity of communication of the device 2 that is a policy rule application target with feature quantities of the communication of various devices acquired in advance to identify a type of the device 2. The identification device 3 assigns a unique device ID to each device 2 the type of which has been identified.

The PCRF 4 provides instruction on a policy rule for controlling the communication of the device to the DPI 5. The PCRF 4 holds the device type and a corresponding policy rule in advance. When the identification device 3 notifies the PCRF 4 of the device type and the device ID, the PCRF 4 determines the policy rule corresponding to the acquired device type. Further, the PCRF 4 instructs the DPI 5 to apply the policy rule to the device 2 corresponding to the device ID.

The DPI 5 applies a policy rule provided through the instruction to communication from the device 2 corresponding to the device ID of an instruction target of the PCRF 4 and performs control of the communication of the device 2.

Flow of Communication Process

Figure 2:
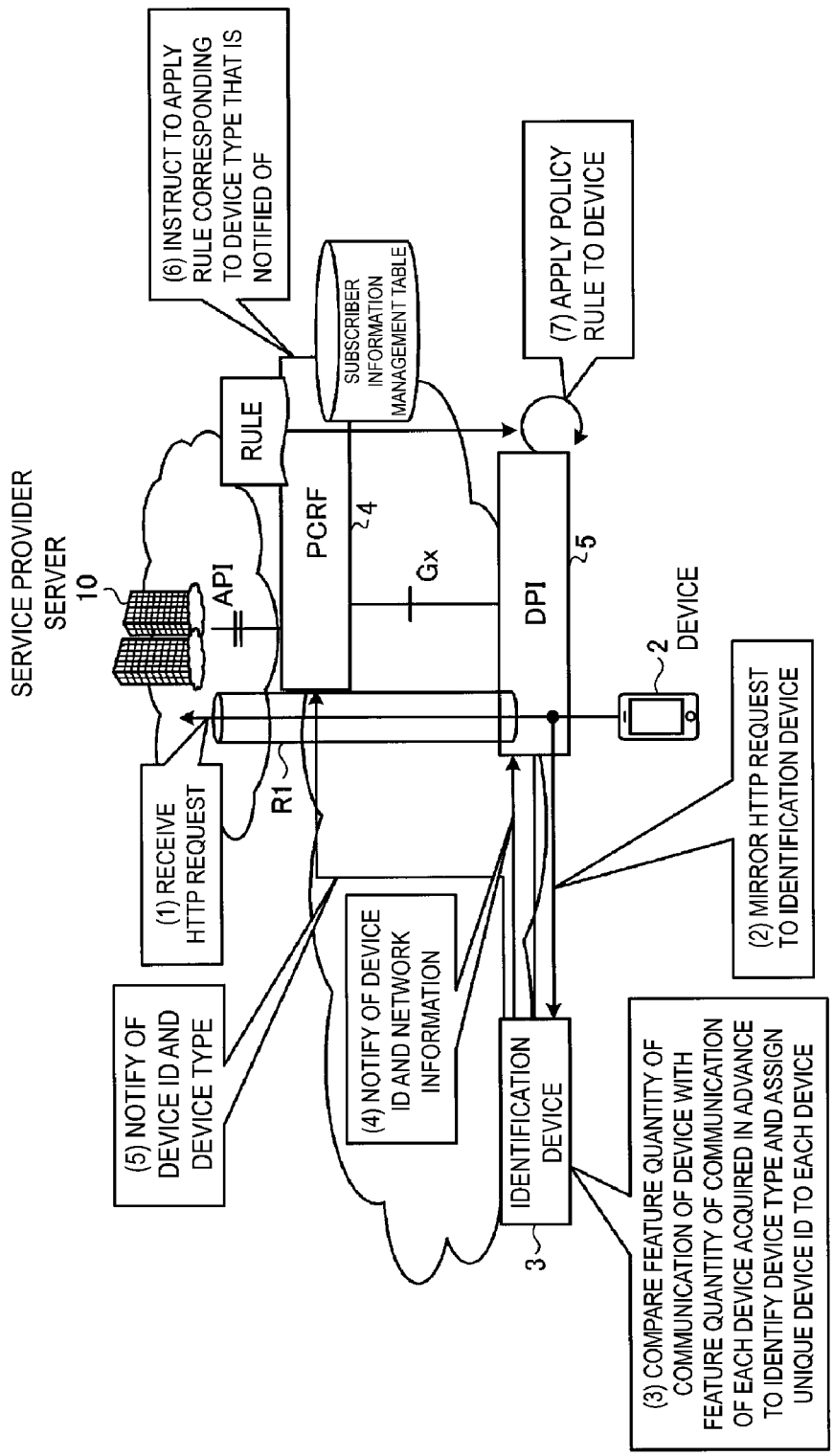
FIG. 2 is a diagram illustrating a flow of a communication process in the communication system illustrated in FIG. 1.

Next, a flow of a communication process in the communication system 1 will be described. FIG. 2 is a diagram illustrating a flow of a communication process in the communication system illustrated in FIG. 1. In FIG. 2, a flow of a process up to the application of the policy rule to the device 2 will be described.

As illustrated in FIG. 2, when the DPI 5 receives the HTTP request from the device 2, the DPI 5 transmits the HTTP request to the service provider server 10 (see (1) in FIG. 2) and mirrors the HTTP request to the identification device 3 (See (2) in FIG. 2).

The identification device 3 compares the feature quantity of the communication of the device 2 with the feature quantity of the communication of each device acquired in advance to identify the type of the device 2. The identification device 3 assigns a unique device ID to the device 2 the type of which has been identified (see (3) in FIG. 2). Subsequently, the identification device 3 notifies the DPI 5 of the device ID and the network information corresponding to the device ID (see (4) in FIG. 2), and also notifies the PCRF 4 of the device ID and the device type (see (5) in FIG. 2).

The PCRF 4 holds a corresponding policy rule for each device type. A correspondence relationship between the policy rule and the device type is set in the PCRF 4 in advance by a network operator of an affiliation network. Alternatively, the correspondence relationship between the policy rule and the device type is set in the PCRF 4 in advance by the service provider via an application programming interface (API). The PCRF 4 instructs the DPI 5 to apply the policy rule corresponding to the device type that is notified of (see (6) in FIG. 2). The DPI 5 applies the policy rule provided through the instruction by the PCRF 4 to the communication from the device corresponding to the device ID of the instruction target (see (7) in FIG. 2).

Thus, the communication system 1 registers the policy rule and the device type in the PCRF 4 in association with each other in advance, and sets the policy rule to be applied with the device type as a key, thereby realizing network policy management and control in units of devices.

Configuration of Identification Device

Figure 3:
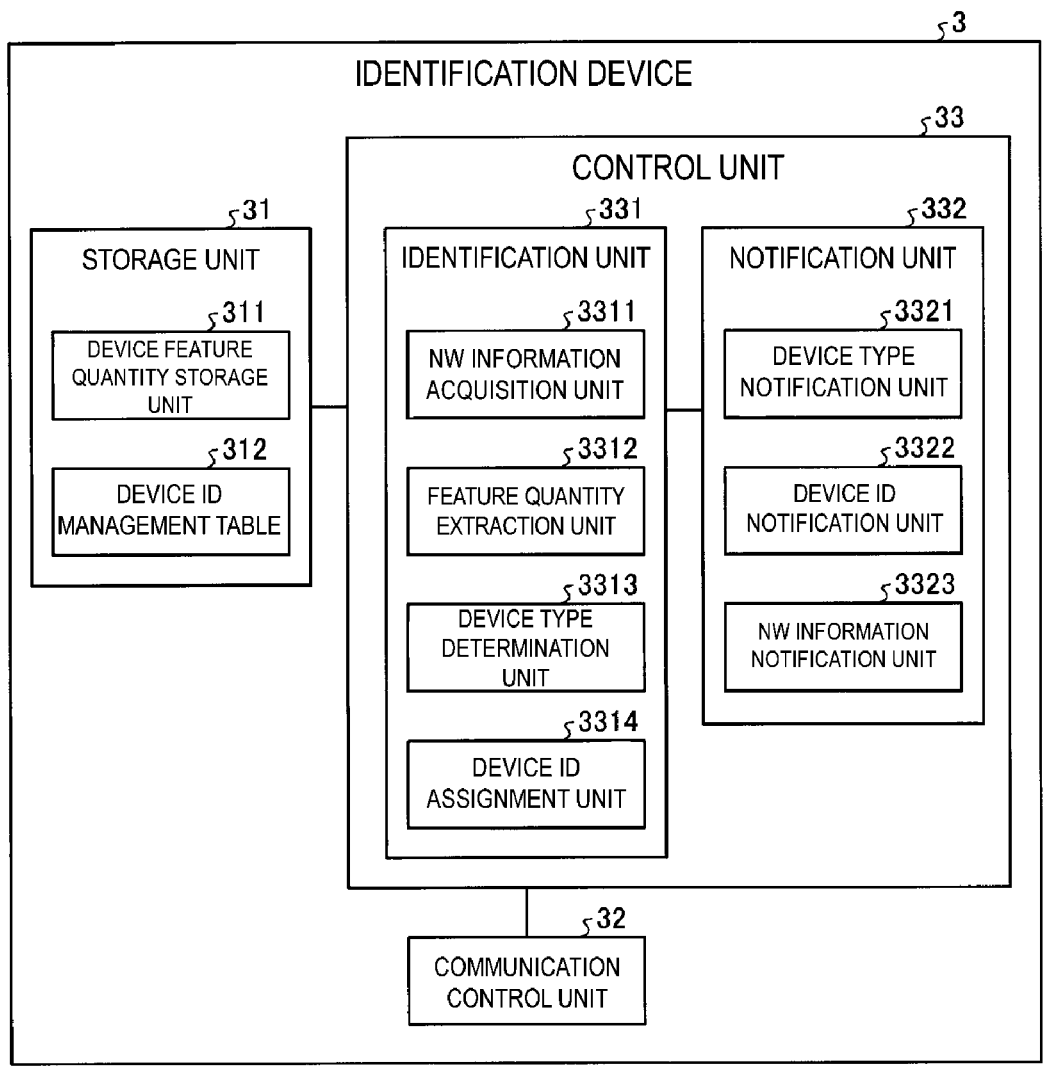
FIG. 3 is a schematic diagram illustrating a schematic configuration of an identification device illustrated in FIG. 1.

Next, a functional configuration of the identification device 3 will be described. FIG. 3 is a schematic diagram illustrating a schematic configuration of the identification device 3 illustrated in FIG. 1. The identification device 3 includes a storage unit 31, a communication control unit 32, and a control unit 33, as illustrated in FIG. 3.

The storage unit 31 is realized by a semiconductor memory device such as a random access memory (RAM) or a flash memory, or a storage device such as a hard disk or an optical disc. The storage unit 31 may be configured to communicate with the control unit 33 via a communication control unit 21. The storage unit 31 includes a device feature quantity storage unit 311 and a device ID management table 312.

The device feature quantity storage unit 311 stores the feature quantities of the communication of various devices acquired in advance. These feature quantities are obtained by receiving communication of various devices types of which are clear in advance, extracting header information of the communication accumulated for each device, and accumulating the extracted header information for each device type. The header information includes an IP packet length, a TCP port number, and the like, which are registered as feature quantities for each device in the device feature quantity storage unit 311.

Figures 4, 5:
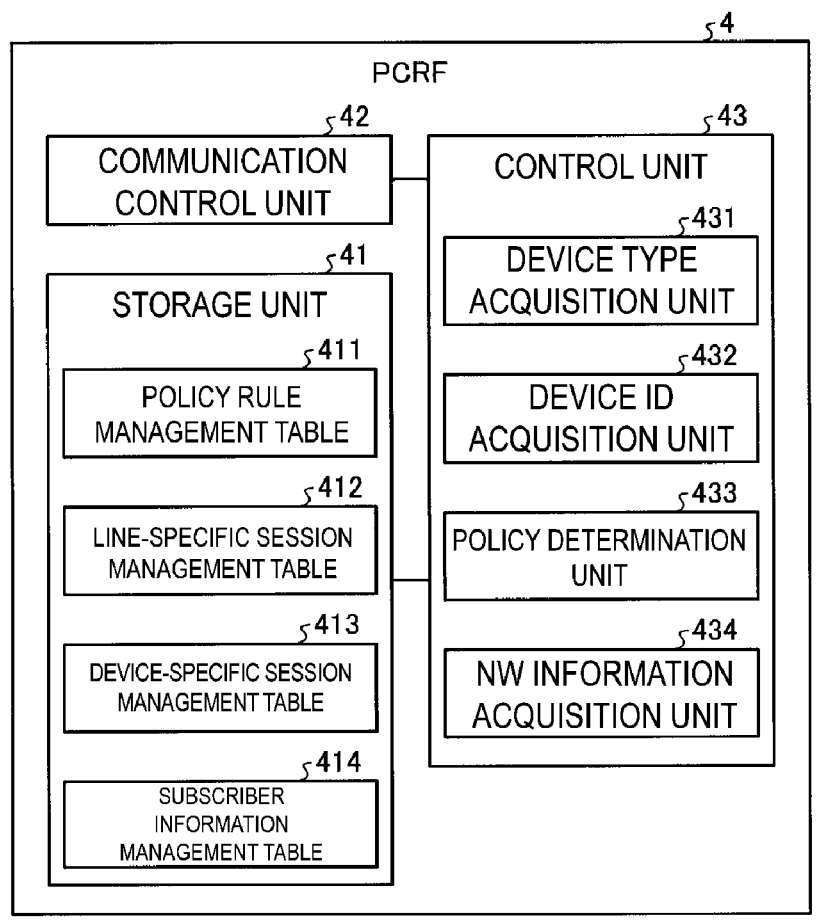
FIG. 4 is a diagram illustrating an example of a data structure of a device ID management table illustrated in FIG. 3.
FIG. 5 is a schematic diagram illustrating a schematic configuration of a PCRF illustrated in FIG. 1.

The device ID management table 312 is a table for managing the device ID that an identification unit 331 (which will be described below) has assigned to the device 2. FIG. 4 is a diagram illustrating an example of a data structure of the device ID management table 312 illustrated in FIG. 3. As illustrated in FIG. 4, the device ID management table 312 associates the type of the device 2 on which the identification has been performed with the device ID assigned to the device 2. The type of device 2 is identified by the identification unit 331 (which will be described below).

The communication control unit 32 is realized by a network interface card (NIC) or the like, and performs communication with the PCRF 4 or the DPI 5 via a telecommunication line such as a LAN or the Internet. For example, the communication control unit 32 receives the HTTP request of the device 2 mirrored from the DPI 5. Further, the communication control unit 32 transmits the type of the device 2, the device ID, and the network (NW) information corresponding to the device ID to the PCRF 4 or the DPI 5.

The control unit 33 controls the entire identification device 3. The control unit 33 is, for example, an electronic circuit such as a central processing unit (CPU) or a micro processing unit (MPU), or an integrated circuit such as an application specific integrated circuit (ASIC) or a field programmable gate array (FPGA). Further, the control unit 33 includes an internal memory for storing a program defining various processing procedures or control data, and executes each process using the internal memory. Further, the control unit 33 functions as various processing units by various programs being operated. The control unit 33 includes the identification unit 331 and a notification unit 332.

The identification unit 331 compares the feature quantity of the communication of the device 2 that is actually performing communication with the feature quantities of the communication of the various devices acquired in advance to identify the type of the device 2. The identification unit 331 includes an NW information acquisition unit 3311, a feature quantity extraction unit 3312, a device type determination unit 3313, and a device ID assignment unit 3314.

The NW information acquisition unit 3311 acquires the NW information from the mirrored HTTP request of the device 2.

The feature quantity extraction unit 3312 extracts the feature quantity from the mirrored HTTP request of the device 2. The feature quantity extraction unit 3312 extracts the header information from the HTTP request of the device 2 as a feature quantity.

The device type determination unit 3313 compares communication of the device 2 that is actually performing communication with a past communication tendency of each device to determine a type of the device 2. Specifically, the device type determination unit 3313 compares the feature quantity of the communication of the device 2 extracted by the feature quantity extraction unit 3312 with the feature quantities of the communication of various devices stored in the device feature quantity storage unit 311 to determine the type of the device 2.

The device ID assignment unit 3314 assigns a device ID unique to the device 2 to the device 2 the type of which has been determined by the device type determination unit 3313. The device ID assignment unit 3314 registers the assigned device ID and the device type to which this device ID has been assigned in the device ID management table 312.

The notification unit 332 notifies the PCRF 4 and the DPI 5 of an identification result of the identification unit 331. The notification unit 332 includes a device type notification unit 3321 that notifies of the type of the device 2 determined by the identification unit 331, a device ID notification unit 3322 that notifies of the device ID assigned by the device ID assignment unit 3314, and an NW information notification unit 3323 that notifies of the NW information of the device 2 that is a determination target of the identification unit 331. The notification unit 332 notifies the PCRF 4 of the type of the device 2 on which the identification has been performed, and the device ID assigned to the device 2. The notification unit 332 notifies the DPI 5 of the device ID assigned to the device 2 on which the identification has been performed, and the NW information of the device 2. The NW information is, for example, a VLAN and an IP address. Further, the notification unit 332 transmits the subscriber identification information such as a source address or a source port together with the device ID.

The identification device 3 may be a device capable of transmitting a device type and a device ID, and a functional configuration and operation of the identification device 3 illustrated in FIG. 3 are merely examples.

Configuration of PCRF

Next, a functional configuration of the PCRF 4 will be described. FIG. 5 is a schematic diagram illustrating a schematic configuration of the PCRF 4 illustrated in FIG. 1. The PCRF 4 includes a storage unit 41 (a first storage unit), a communication control unit 42, and a control unit 43, as illustrated in FIG. 5.

The storage unit 41 has the same function as the storage unit 31. The storage unit 41 includes a policy rule management table 411 (a first table), a line-specific session line table 412, a device-specific session management table 413, and a subscriber information management table 414.

The policy rule management table 411 is a table in which a policy rule is associated with each device type. FIG. 6 is a diagram illustrating an example of a data structure of the policy rule management table 411 illustrated in FIG. 5.

The policy rule management table 411 has a configuration in which items of the device type and the policy rule are provided, as illustrated in FIG. 6. In the example of FIG. 6, a policy rule "microphone rule" is registered in a device type "microphone", and a policy rule "camera rule" is registered in a device type "camera".

A correspondence relationship between the policy rule and the device type registered in the policy rule management table 411 is set in the PCRF 4 in advance by the network operator of the affiliation network. Alternatively, the correspondence relationship between the policy rule and the device type registered in the policy rule management table 411 is set in the PCRF 4 in advance by the service provider via the API.

The line-specific session management table 412 is a table for managing sessions in units of contract lines. FIG. 7 is a diagram illustrating an example of a data structure of the line-specific session management table 412 illustrated in FIG. 5.

The line-specific session management table 412 has items of a contract ID of a user, a session ID, and an applied policy rule, as illustrated in FIG. 7. In the example of FIG. 7, a session ID "session ID_1" and a policy rule "default rule" are registered in a contract ID "contract ID_1".

A device-specific session management table 413 is a table for managing sessions in units of devices. FIG. 8 is a diagram illustrating a data structure of the device-specific session management table 413 illustrated in FIG. 5.

As illustrated in FIG. 8, the device-specific session management table 413 has items of a device ID, a session ID, and an applied policy rule. In the example of FIG. 8, a session ID "session ID_3" and a policy rule "microphone rule" are registered in the device ID "device ID_1".

The subscriber information management table 414 is a table for managing subscriber information. FIG. 9 is a diagram illustrating a data structure of the subscriber information management table 414 illustrated in FIG. 5. The subscriber information management table 414 has items of a contract ID, a contract service, a device ID, and a device type, as illustrated in FIG. 9. In the example of FIG. 9, a contract service "default", the device ID "device ID_1", and the device type "microphone" are registered in the contract ID "contract ID_1". The device ID and the device type corresponding to the device ID notified of by the identification device 3 are registered in the subscriber information management table 414.

The communication control unit 42 has the same function as the communication control unit 32. The communication control unit 42 receives the type and the device ID of the device 2 from the identification device 3. In this case, the notification unit 332 receives subscriber identification information such as a source address and a source port together with the device ID from the identification device 3. Further, the communication control unit 42 transmits a policy rule to be applied to the device 2 to the DPI 5 together with the device ID.

The control unit 43 has the same function as the control unit 33, and is realized by using an electronic circuit such as a CPU or an integrated circuit such as an ASIC. The control unit 43 includes a device type acquisition unit 431 (a first acquisition unit), a device ID acquisition unit 432 (a first acquisition unit), a policy determination unit 433, and an NW information acquisition unit 434.

The device type acquisition unit 431 acquires a type of the device 2, which is a policy rule application target, from the identification result received from the identification device 3. The device ID acquisition unit 432 acquires the device ID assigned to the device 2, which is a policy rule application target, from the identification result received from the identification device 3.

The device type acquisition unit 431 and the device ID acquisition unit 432 register the acquired device ID and the device type in each table of the storage unit 41 on the basis of the subscriber identification information such as the source address and the source port. The device ID acquisition unit 432 associates the device ID with the session ID that can be picked up by the subscriber identification information, and registers them in the device-specific session management table 413. The device type acquisition unit 431 and the device ID acquisition unit 432 associate the device ID and the device type with the contract ID that can be picked up by the subscriber identification information and register them in the subscriber information management table 414.

The policy determination unit 433 determines a policy rule corresponding to the device type acquired by the device type acquisition unit 431 on the basis of content of the policy rule management table 411. The policy determination unit 433 instructs the DPI 5 to apply the determined policy rule to the device 2 corresponding to the device ID acquired by the device ID acquisition unit 432. For example, when the type of the device 2 acquired by the device type acquisition unit 431 is "camera", the policy determination unit 433 refers to the policy rule management table 411 to determine the "camera rule" corresponding to "camera" as the policy rule of this device 2.

The policy determination unit 433 associates the determined policy rule with the device ID and registers them in each table of the storage unit 41, specifically, the device-specific session management table 413 or the subscriber information management table 414.

The NW information acquisition unit 434 acquires NW information of the device 2. For example, the NW information acquisition unit 434 acquires subscriber identification information such as a VLAN, an IP address, a source address, and a source port of the device 2.

DPI Configuration

Figure 10:
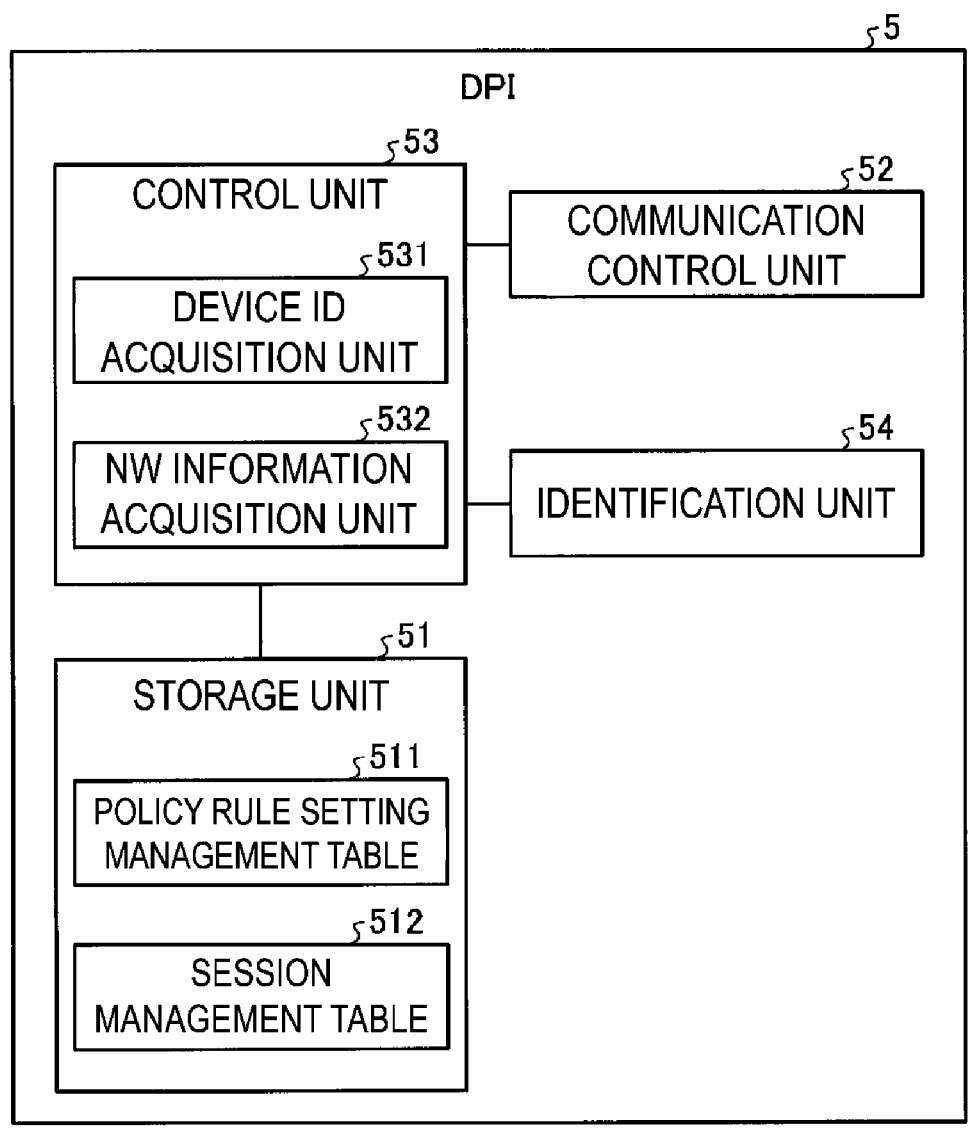
FIG. 10 is a schematic diagram illustrating a schematic configuration of a DPI illustrated in FIG. 1.

Next, a configuration of the DPI 5 will be described. FIG. 10 is a schematic diagram illustrating a schematic configuration of the DPI 5 illustrated in FIG. 1. The DPI 5 includes a storage unit 51 (a second storage unit), a communication control unit 52, a control unit 53, and an identification unit 54, as illustrated in FIG. 10.

The storage unit 51 has the same function as the storage unit 31. The storage unit 51 has a policy rule setting management table 511 and a session management table 512 (a second table).

The policy rule setting management table 511 is a table in which control content of policy rules is set. FIG. 11 is a diagram illustrating a data structure of the policy rule setting management table 511 illustrated in FIG. 10.

The policy rule setting management table 511 has items of a policy rule name and control content, as illustrated in FIG. 11. In the example of FIG. 11, "best effort" is registered as the control content in the policy rule "microphone rule".

The session management table 512 is a table for managing sessions. FIG. 12 is a diagram illustrating the session management table 512 illustrated in FIG. 10. The session management table 512 has items of NW information, a device ID, a session ID, and an applied policy rule, as illustrated in FIG. 12. In an NW information field, items such as a VLAN ID, an IP address, and a port number are set as IDs for identifying the communication of the device 2 corresponding to the device ID.

In the example of FIG. 12, "device ID_1", "session ID_3", and "microphone rule" are registered for the NW information "VLAN_ID_1", "IP address_3", and "port number_3". Thus, the session management table 512 stores the device ID and the network information of the device corresponding to the device ID in association with each other.

The communication control unit 52 has the same function as the communication control unit 32. The communication control unit 52 performs communication with the device 2, the service provider server 10, and the PCRF 4. For example, the communication control unit 52 transmits the HTTP request from the device 2 to the service provider server 10 and mirrors the HTTP request to the identification device 3. The communication control unit 52 receives the device ID and the NW information of the device 2 from the identification device 3. The communication control unit 52 receives the device ID and the policy rule to be applied to the device 2 having the device ID from the PCRF 4. Further, the communication control unit 52 refers to the session management table 512 to apply the policy rule provided through the instruction to communication from the device 2 corresponding to the device ID of the instruction target of the PCRF 4 and performs control.

The control unit 53 has the same function as the control unit 33, and is realized by using an electronic circuit such as a CPU or an integrated circuit such as an ASIC. The control unit 53 registers the policy rule notified of by the PCRF 4 in the session management table 512 in association with the device ID. The control unit 53 includes a device ID acquisition unit 531 (a second acquisition unit) and an NW information acquisition unit 532.

The device ID acquisition unit 531 acquires the device ID transmitted from the identification device 3 via the communication control unit 52. This device ID is assigned to the device 2 that is a policy rule application target.

The NW information acquisition unit 532 acquires the NW information of the device 2 that is a policy rule application target transmitted from the identification device 3 via the communication control unit 52. The device ID acquisition unit 531 and the NW information acquisition unit 532 register the acquired device ID and the NW information in the session management table 512.

The identification unit 54 identifies which communication is communication received by the DPI 5, and outputs an identification result to the communication control unit 52. The communication control unit 52 applies a policy rule on the basis of an identification result of the identification unit 54 to perform communication control.

Identification Information Registration Process of DPI

Figure 13:
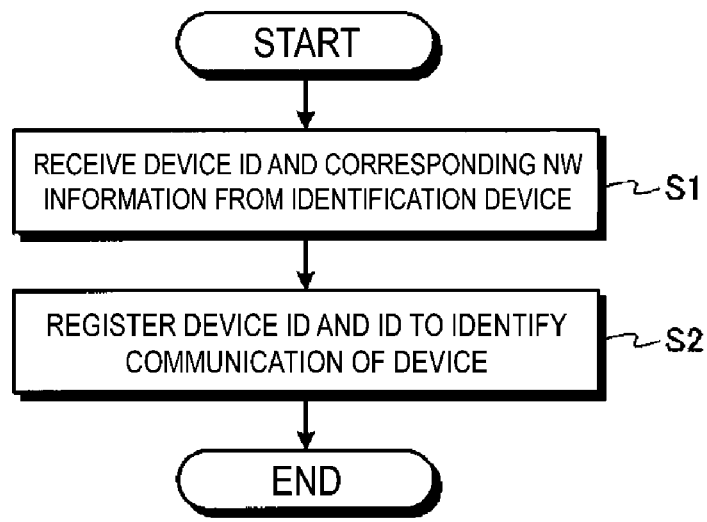
FIG. 13 is a flowchart illustrating a processing procedure of an identification information registration process of the DPI illustrated in FIG. 1.

Next, an identification information registration process of the DPI 5 will be described. FIG. 13 is a flowchart illustrating a processing procedure of the identification information registration process of the DPI 5 illustrated in FIG. 1.

As illustrated in FIG. 13, when the DPI 5 receives the device ID and the NW information corresponding to the device ID from the identification device 3 (step S1), the DPI 5 registers the received device ID and an ID for identifying communication of the device corresponding to the device ID in the storage unit 51 (step S2) and ends the process.

Figure 14:
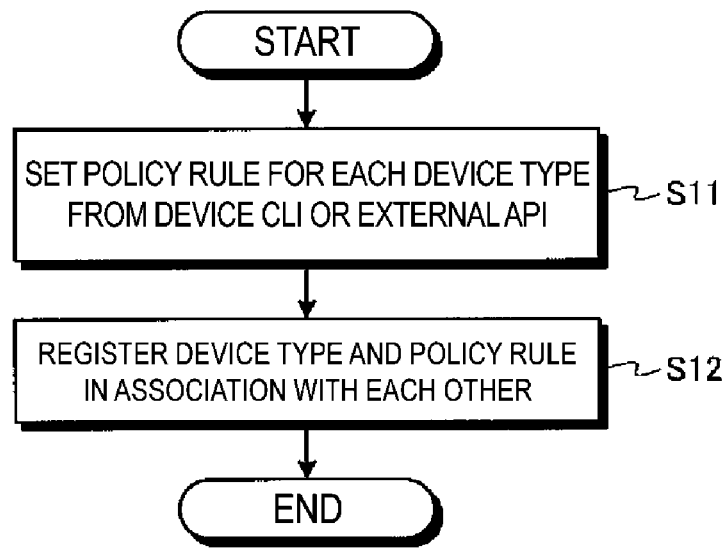
FIG. 14 is a flowchart illustrating a processing procedure of a policy rule registration process of the PCRF illustrated in FIG. 1.

Policy Rule Registration Process of PCRF Next, a policy rule registration process of the PCRF 4 will be described. FIG. 14 is a flowchart illustrating a processing procedure of the policy rule registration process of the PCRF 4 illustrated in FIG. 1.

When a policy rule is set for each device type from a device command line interface (CLI) or an external API (step S11), the PCRF 4 registers the device type and the policy rule in the storage unit 41 in association with each other (step S12), and ends the process, as illustrated in FIG. 14.

Figure 15:
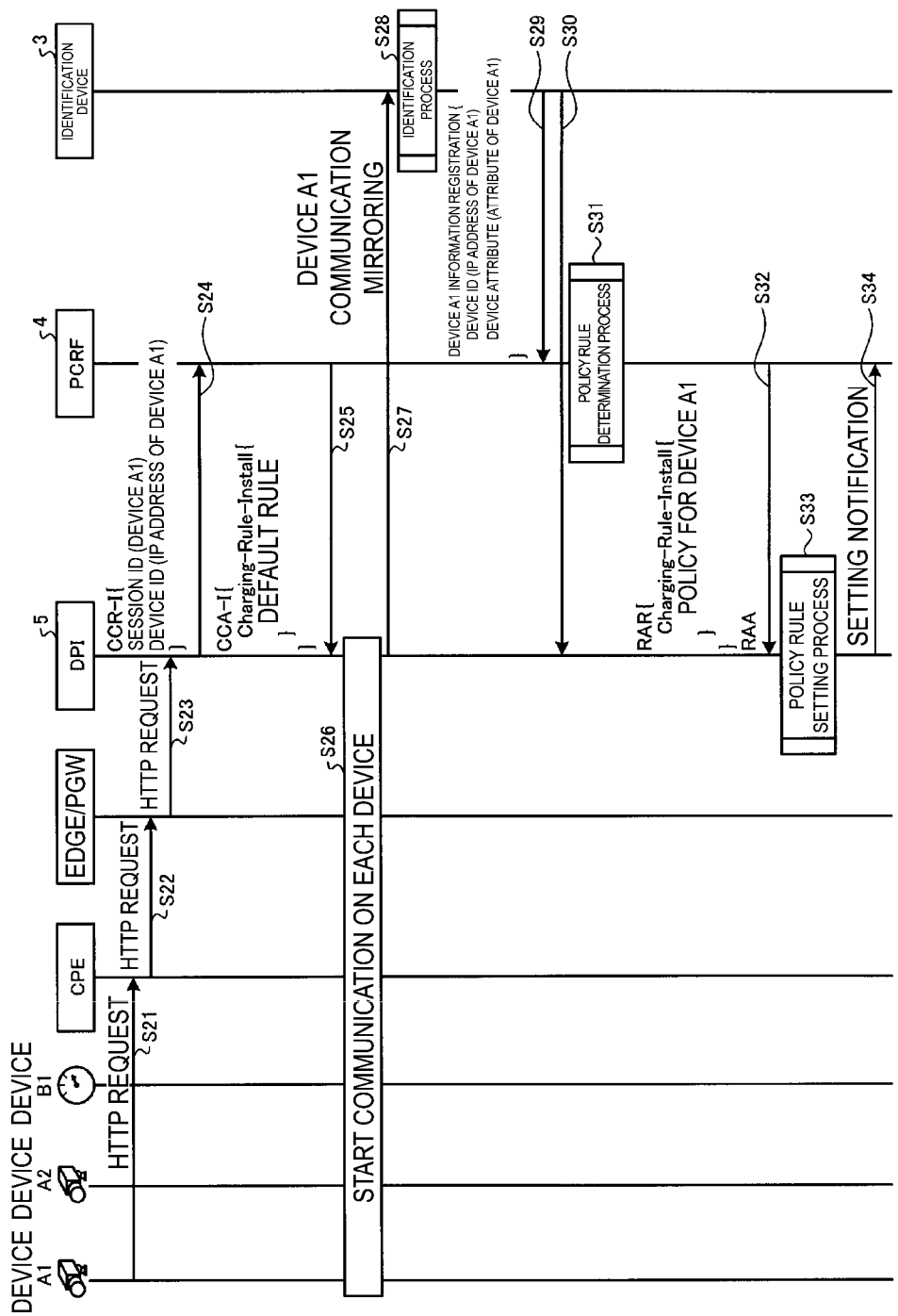
FIG. 15 is a sequence diagram illustrating a processing procedure of the policy rule setting process for a device in the communication system illustrated in FIG. 1.

Policy Rule Setting Process for Device Next, a policy rule setting process for a device in the communication system 1 will be described. FIG. 15 is a sequence diagram illustrating a processing procedure of the policy rule setting process for a device in the communication system 1 illustrated in FIG. 1.

A case in which a policy rule is set for a device A1 among devices A1, A2, and B1 that are management targets illustrated in FIG. 15 will be described by way of example. The device A1 transmits the HTTP request to the DPI 5 via a CPI and an edge/PGW (steps S21 to S23). The DRI 5 transmits a session ID of the device A1 and an IP address of the device A1 to the PCRF 4 using a credit control request-initial (CCR-I) command (step S24). In response thereto, the PCRF 4 transmits a default policy rule for the device A1 to the DPI 5 using a credit control answer-initial (CCA-I) command (step S25).

When the communication is started in each device (step S26), the DPI 5 mirrors the communication of the device A1 to the identification device 3 (step S27). The identification device 3 performs an identification process for identifying the type of the device A1 (step S28).

The identification device 3 notifies the PCRF 4 of the device ID and the device type of the device A1 so that information on the device A1 is registered, and notifies the DPI 5 of the device ID and the NW information of the device A1 (step S29, 30).

The PCRF 4 performs a policy rule determination process for determining a policy rule corresponding to the type of the device A1 on the basis of the device ID and device type of the device A1 notified of from the identification device 3 (step S31). The PCRF 4 transmits a policy rule to be applied to the device A1 using a Re Auth Request (RAR) command (step S32).

The DPI 5 registers the device ID and the NW information of the device A1 notified of from the identification device 3, and performs a policy rule application process for setting the policy rule provided through the instruction from the PCRF 4 in the communication of the device A1 (step S33). The DPI 5 then notifies the PCRF 4 of a setting notification (step S34).

Figure 16:
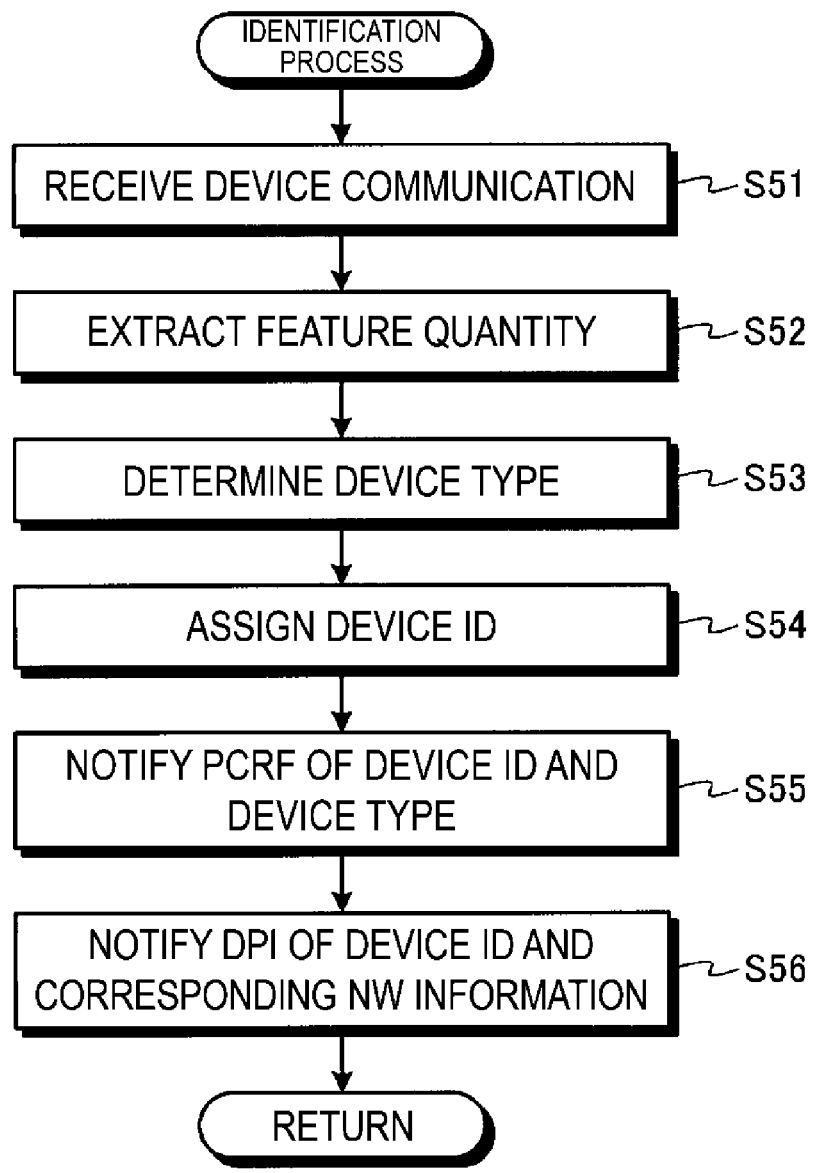
FIG. 16 is a flowchart illustrating a processing procedure of an identification process illustrated in FIG. 15.

Identification Process Next, the identification process (step S28 in FIG. 15) will be described. FIG. 16 is a flowchart illustrating a processing procedure of the identification process illustrated in FIG. 15.

As illustrated in FIG. 16, when the identification device 3 receives the mirrored communication of the device A1 (step S51), the identification device 3 extracts the feature quantity from the mirrored communication of the device 2 (step S52). The identification device 3 compares the feature quantity of the communication of the device A1 that is actually performing communication with the feature quantities of the communication of various devices acquired in advance to identify the type of the device A1 (step S53). The identification device 3 assigns a unique device ID to the device A1 the type of which has been identified (step S54).

The identification device 3 notifies the PCRF 4 of the device ID and the device type (step S55), notifies the DPI 5 of the device ID and the NW information corresponding to the device ID (step S56), and ends the identification process.

Figure 17:
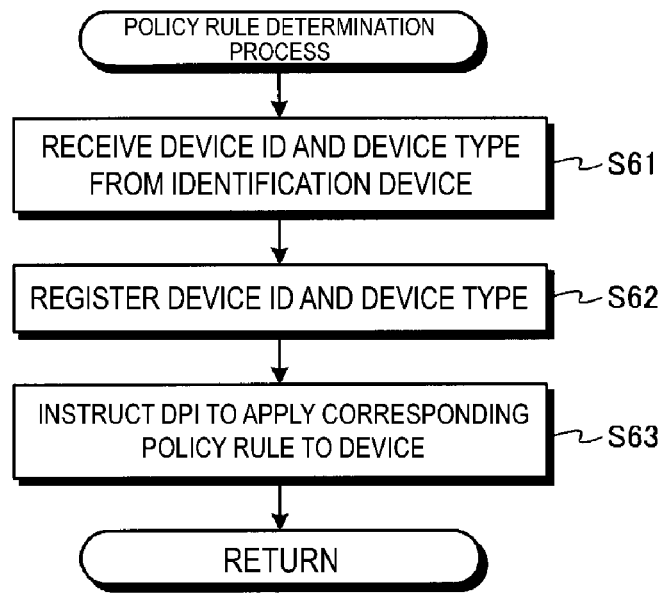
FIG. 17 is a flowchart illustrating a processing procedure of a policy rule determination process illustrated in FIG. 15.

Policy Rule Determination Process Next, a policy rule determination processing process (step S31 in FIG. 15) will be described. FIG. 17 is a flowchart illustrating a processing procedure of the policy rule determination process illustrated in FIG. 15.

When the PCRF 4 receives the type of the device A1 that is a policy rule application target and the device ID assigned to the device A1 from the identification device 3 (step S61), the PCRF 4 registers the device ID and the type of the device A1 in the storage unit 41, as illustrated in FIG. 17 (step S62). The PCRF 4 determines the policy rule corresponding to the device type of the device A1, instructs the DPI 5 to apply the policy rule corresponding to the device A1 (step S63), and ends the process.

Figure 18:
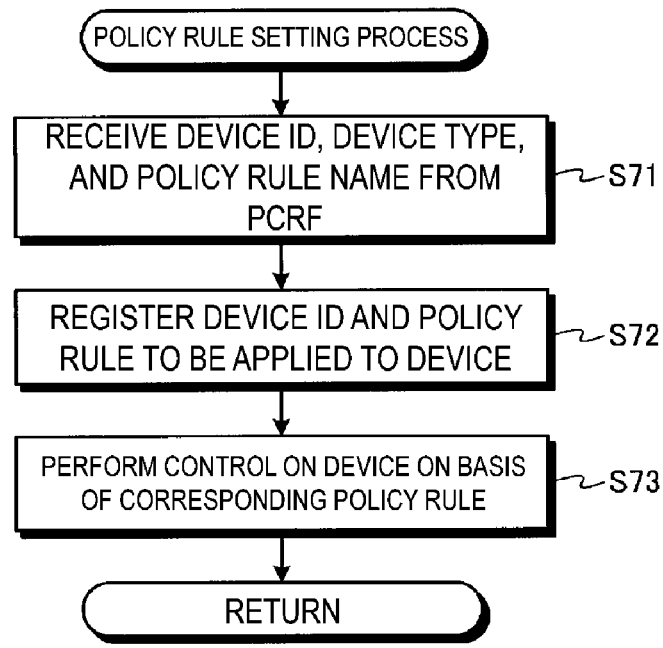
FIG. 18 is a flowchart illustrating a processing procedure of the policy rule setting process illustrated in FIG. 15.

Policy Rule Setting Process Next, the policy rule setting process (step S33 in FIG. 15) will be described. FIG. 18 is a flowchart illustrating a processing procedure of the policy rule setting process illustrated in FIG. 15.

When the DPI 5 receives the device ID, the device type, and the policy rule name from the PCRF 4 (step S71), the DPI 5 registers the device ID and the policy rule to be applied to the device A1 corresponding to the device ID in the storage unit 51, as illustrated in FIG. 18 (step S72). The DPI 5 performs control based on the corresponding policy rule on the device A1 (step S73).

Effects of Embodiment 1

Thus, in the communication system 1 according to Embodiment 1, the PCRF 4 stores the table in which the policy rule is associated with each device type. Further, in the communication system 1, when a device type that is a policy rule application target and a device ID assigned to the device are acquired, a policy rule corresponding to the device type is determined on the basis of content of the table. The DPI 5 stores the device ID and the network information of the device corresponding to the device ID in association with each other. Further, when the DPI 5 acquires the device ID assigned to the device 2 that is a policy rule application target, the DPI 5 applies the policy rule provided through the instruction by the PCRF 4 to the communication from the device 2 corresponding to the device ID of the instruction target and performs control.

Thus, the communication system 1 registers the policy rule and the device type in the PCRF 4 in association with each other in advance, and sets the policy rule to be applied with the device type as a key, thereby realizing network policy management and control in units of devices. In other words, the communication system 1 enables flexible traffic control according to the type of the device 2. In the communication system 1, it is possible for the network side (provider side) to ascertain how many types of devices 2 are connected and it is possible to perform traffic control depending on each device type.

Further, in the communication system 1, because the identification device 3 identifies the device type, it is also possible to determine and apply an appropriate policy rule according to the device type regardless of a communication type for an encrypted flow. This allows what kind of device is connected and how many devices are connected to be ascertained from the network side for the encrypted flow in the communication system 1, and allows traffic control depending on these devices to be appropriately executed.

Further, in the communication system 1, because the identification device 3 specifies the device type from a flow of the device 2, it is not necessary to modify the existing device 2. Thus, according to the communication system 1, it is possible to appropriately realize traffic control for each device type without executing additional development of a device 2 of each company.

The communication system 1 discloses information on the PCRF 4 via the external API, making it possible for a user to ascertain what kind of policy rule is applied to each device 2 that the user connects to the network. Further, in the communication system 1, it is contemplated that a range of service selection is widened and user satisfaction is improved by the user changing the policy rule to be applied to each device 2 via the external API.

Further, in the communication system 1, because the policy rule can be applied to each device type, it is possible for a device development company or a service provider to realize an additional service of applying a specific policy rule only to the device 2 of the company.

The identification device 3 can not only identify the device type, but can also learn statistical information such as information of the device 2 connected in the past, a communication tendency of a user, and a tendency of an applied policy rule. This allows the identification device 3 to improve accuracy of the identification of the type or use of a newly connected device 2 and allows the PCRF 4 to automatically set an optimal policy rule with higher accuracy.

Figure 19:
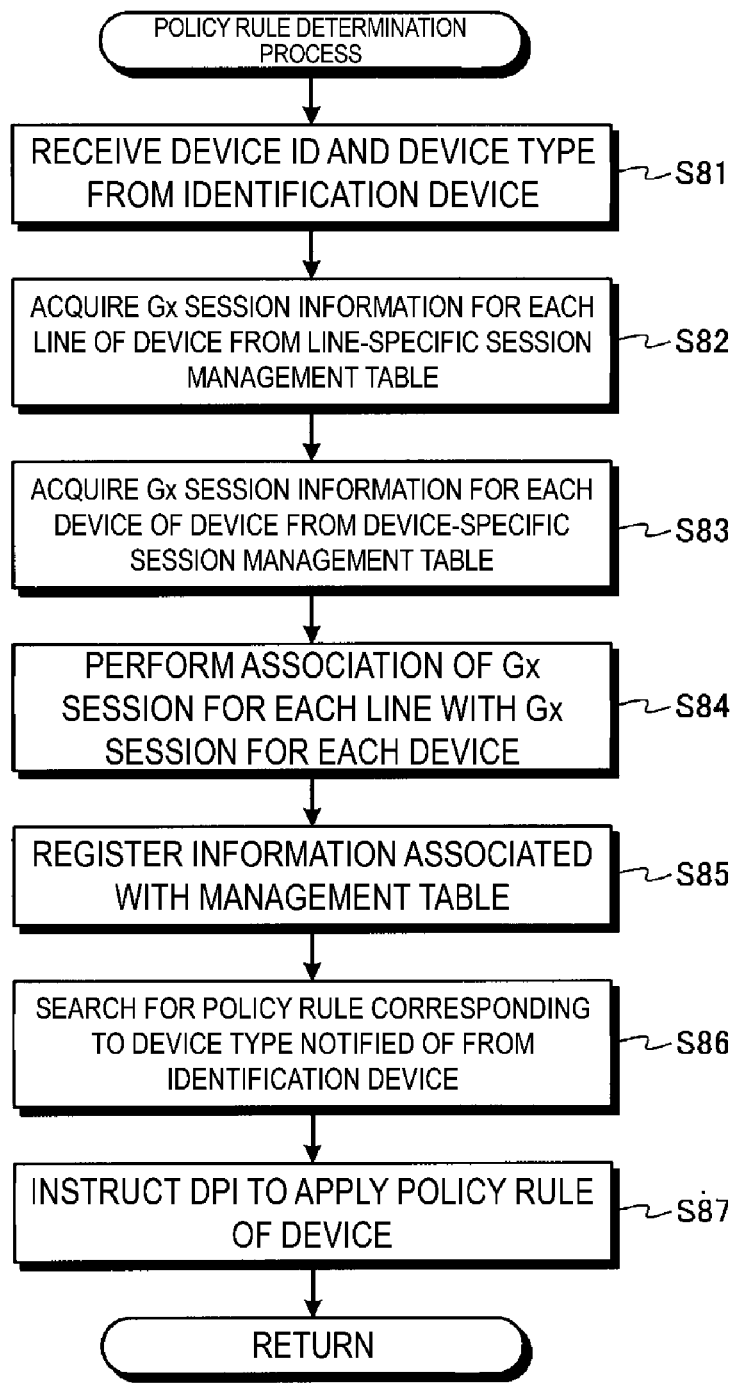
FIG. 19 is a flowchart illustrating another processing procedure of the policy rule determination process illustrated in FIG. 15.

The PCRF 4 performs a process of associating the Gx session for each line with the Gx session for each device so that in the DPI 5, the communication control unit 52 can establish the Gx session for each device with the PCRF 4 separately from the Gx session for each contract. This will be specifically described with reference to FIGS. 19 and 20. FIG. 19 is a flowchart illustrating another processing procedure of the policy rule determination process illustrated in FIG. 15. FIG. 20 is a diagram illustrating an example of a data structure of the table held in the PCRF 4.

As illustrated in FIG. 19, when the PCRF 4 receives the device ID and the device type together with the subscriber information from the identification device 3 (step S81), the PCRF 4 acquires Gx session information for each line of the device from the line-specific session management table 412 (step S82). The PCRF 4 acquires Gx session information for each device of the device from the device-specific session management table 413 (step S83).

The PCRF 4 performs association of the Gx session for each line with the Gx session for each device (step S84). Subsequently, the PCRF 4 registers the associated information in the management table (step S85).

An example of a data structure of the management table will be described herein. The management table has items of a contract ID, a device ID, a device type, a session ID, and an applied policy rule, as illustrated in FIG. 20. The PCRF associates the Gx session for each line with the Gx session for each device and registers the sessions in the management table. In other words, the PCRF 4 registers the contract ID of the line and the device ID and device type of the device in the management table in association with the session ID. For example, the PCRF 4 registers the device ID "device ID_1" and the device type "microphone" corresponding to "session ID_3" with respect to the contract ID "contract ID_1" corresponding to a session ID that is "session ID_3" in the session management table.

The PCRF 4 searches the policy rule management table 411 for the policy rule corresponding to the device type notified of by the identification device 3 (step S86). The PCRF 4 instructs the DPI 5 to apply this policy rule as the policy rule of the corresponding device 2 (step S87). In this case, the PCRF 4 registers the policy rule applied to the device 2 in an applied policy rule field corresponding to the device ID of the device 2 in the management table.

Here, the DPI 5 associates the device ID and the NW information of the device with subscriber identification information (VLAN information in the case of a fixed type or SIM information in the case of a mobile type) and manages them using the session management table 512. This allows the PCRF 4 to associate the Gx session for each line with the Gx session for each device using the management table and then allows the DPI 5 to establish the Gx session for each contract and the Gx session for each device with the PCRF 4.

Embodiment 2

Figure 21:
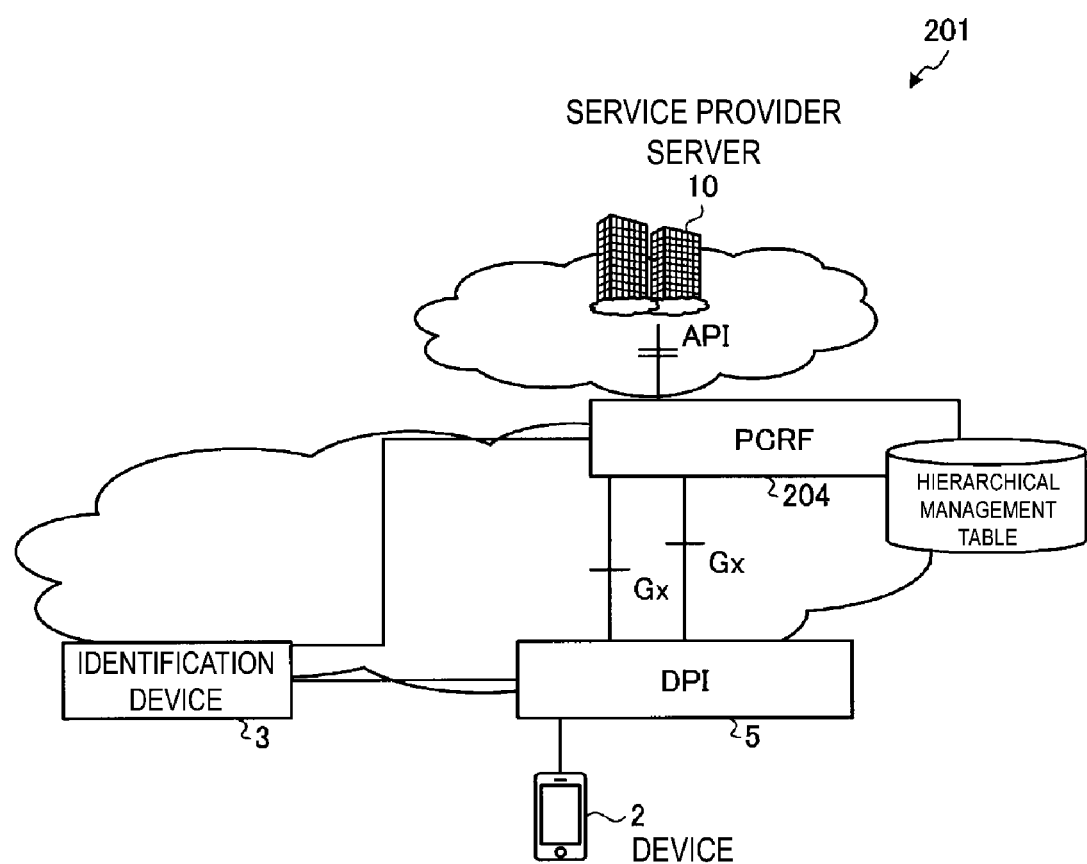
FIG. 21 is a diagram illustrating a schematic configuration of a communication system according to Embodiment 2.

Next, Embodiment 2 will be described. FIG. 21 is a diagram illustrating a schematic configuration of the communication system according to Embodiment 2. As illustrated in FIG. 21, a communication system 201 according to Embodiment 2 includes a PCRF 204 instead of the PCRF 4 of the communication system 1 illustrated in FIG. 1.

The PCRF 204 holds a policy rule corresponding to each combination of contract information and a device type, and manages user information including user contract information and information on the device in association with each other. The PCRF 204 sets a policy rule according to the device type acquired from the identification device 3 and the contract information of the user, for the device 2 that is a policy rule application target.

Flow of Communication Process

Figure 22:
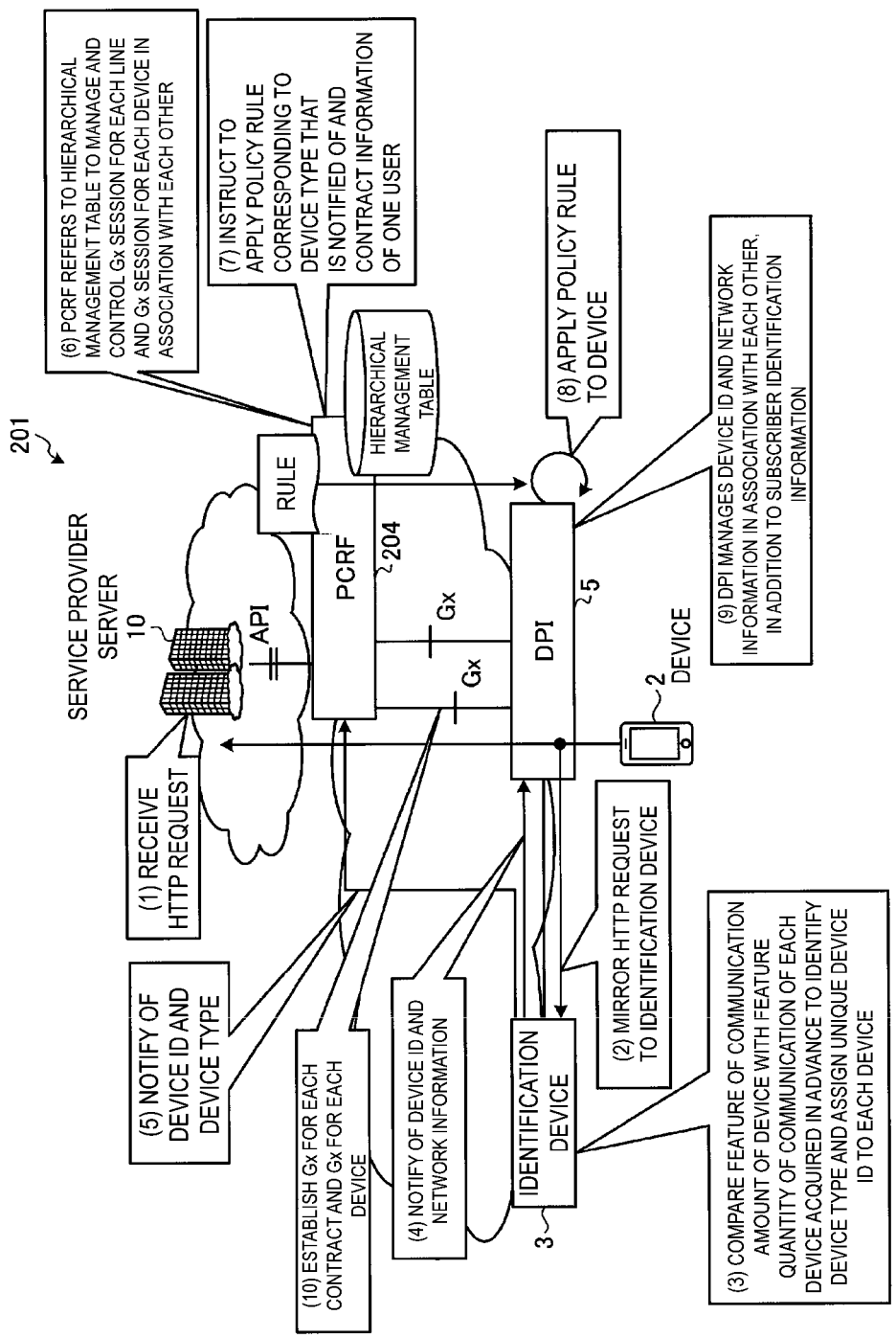
FIG. 22 is a diagram illustrating a flow of a communication process in the communication system illustrated in FIG. 21.

Next, a flow of a communication process in the communication system 201 will be described. FIG. 22 is a diagram illustrating a flow of a communication process in the communication system 201 illustrated in FIG. 21. A flow of a process until the policy rule is applied to the device 2 will be described with reference to FIG. 22. As illustrated in (1) to (5) of FIG. 22, the DPI 5 and the identification device 3 perform a process in the same flow as (1) to (5) of FIG. 2.

The PCRF 4 holds a corresponding policy rule for each combination of the contract information and the device type. A correspondence relationship between the contract information, the device type, and the policy rule is set in the PCRF 204 in advance by a network operator of an affiliation network. Alternatively, a correspondence relationship between the contract information, the device type, and the policy rule is set in the PCRF 204 in advance by the service provider via the API.

The PCRF 4 refers to a subscriber information management table, and manages and controls a Gx session for each line and a Gx session for each device in association with each other (see (6) in FIG. 22). The PCRF 4 instructs the DPI 5 to apply the policy rule corresponding to the device type that is notified of and the user contract information (see (7) in FIG. 22). The DPI 5 applies the policy rule provided through the instruction by the PCRF 4 to the communication from the device corresponding to the device ID of the instruction target (see (8) in FIG. 22). Further, the DPI 5 manages communication using a table (third table) in which the device ID and the network information corresponding to the device 2 having the device ID are associated, in addition to the subscriber identification information (see (9) in FIG. 22). Thus, the DPI 5 can establish a Gx session for each contract and a Gx session for each device with the PCRF 204 (see (10) of FIG. 22).

Thus, in Embodiment 2, it is possible to set a policy rule using the contract information of the user as a key together with the device type and set a policy rule suitable for use of each user even when the device type is the same.

Figures 23, 24:
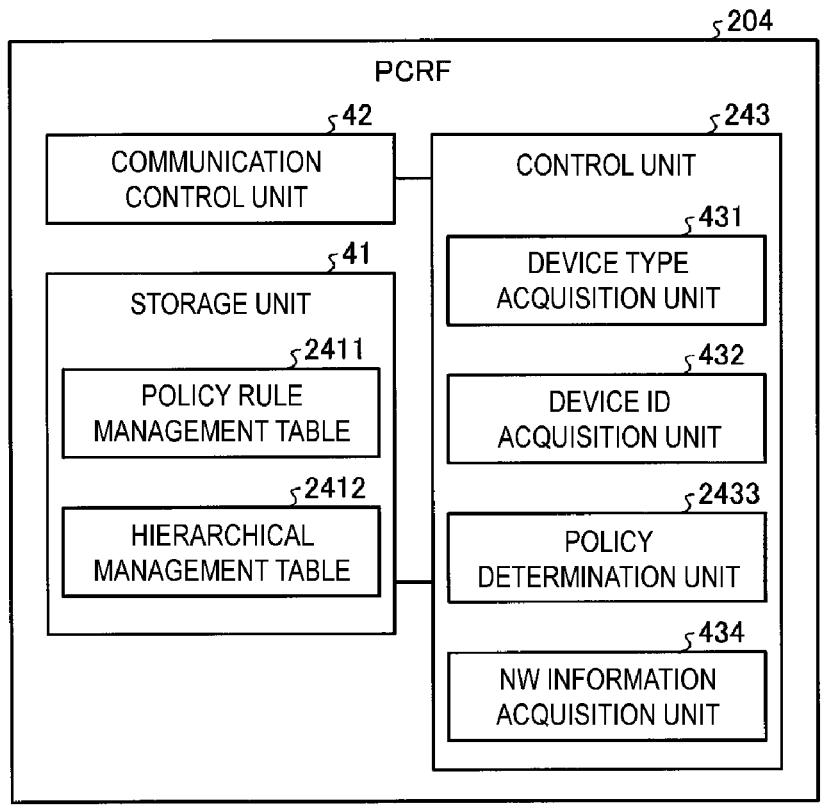
FIG. 23 is a schematic diagram illustrating a schematic configuration of a PCRF illustrated in FIG. 21.
FIG. 24 is a diagram illustrating an example of a data structure of the policy rule setting management table 2411 illustrated in FIG. 23.

Configuration of PCRF Next, a functional configuration of the PCRF 4 will be described. FIG. 23 is a schematic diagram illustrating a schematic configuration of the PCRF 204 illustrated in FIG. 21. The PCRF 4 stores a policy rule management table 2411 (a first table) and a hierarchical management table 2412 (a second table) and includes a control unit 243 including a policy determination unit 2433, as compared with the PCRF 4 illustrated in FIG. 5.

First, the tables stored in the PCRF 204 will be described. The policy rule management table 2411 is a table in which a policy rule corresponding to each combination of the contract information and the device type has been registered. FIG. 24 is a diagram illustrating an example of a data structure of the policy rule setting management table 2411 illustrated in FIG. 23.

As illustrated in FIG. 24, the policy rule management table 2411 has a configuration in which items of a contract service that is contract information, a device type, and a policy rule are provided, and a corresponding policy rule is set for each combination of the contract information and the device type. In the example of FIG. 24, in the case of the contract service "default", a policy rule "microphone rule 1" is registered in the device type "microphone". On the other hand, in the case of the contract service "Gold Plan", the policy rule "microphone rule 2" is registered in the device type "microphone". Thus, in the PCRF 204, even when the device type is the same, a policy rule suitable for a service to be provided to a user is set.

The hierarchical management table 2412 is a table for managing user information including user contract information and device information in association with each other. FIG. 25 is a diagram illustrating an example of a data structure of the hierarchical management table 2412 illustrated in FIG. 23.

As illustrated in FIG. 25, the hierarchical management table 2412 has items of a contract ID, a contract service, a device ID, a device type, a session ID, and an applied policy rule. For example, in the example of FIG. 25, the contract service "default", the device ID "device ID_1", the device type "microphone", the session ID "session ID_3", and the policy rule "microphone rule" are registered for the contract ID "contract ID_1". Thus, the hierarchical management table 2412 associates the contract ID and the contract service of the user that are user information with the device ID and the device type that are device information. Further, the hierarchical management table 2412 associates session information that is the NW information of the device and the policy rule to be applied to the device 2 with the user information and the device information, and stores them. This allows the hierarchical management table 2412 to perform hierarchical management for two units of user information for identifying a user and device information for identifying a device type and an ID.

Next, the control unit 243 will be described. The control unit 243 has the same function as the control unit 43 illustrated in FIG. 5. The control unit 243 includes a policy determination unit 2433, as compared with the control unit 43 illustrated in FIG. 5.

The policy determination unit 2433 determines a policy rule according to the device type acquired by the device ID acquisition unit 431 and the contract information of the user corresponding to the subscriber identification information notified of from the identification device 3 on the basis of content of the policy rule setting management table 2411 and the hierarchical management table 2412. The policy determination unit 2433 instructs the DPI 5 to apply the determined policy rule to the device 2 corresponding to the device ID acquired by the device ID acquisition unit 431.

For example, a case in which the device ID acquired by the device ID acquisition unit 431 is "device ID_2", the type of the device 2 is "camera", and the contract ID of the user picked up by the subscriber identification information is "contract ID_1" will be described by way of example. In this case, the policy determination unit 2433 determines the contract service "default" of the user having this contract ID "contract ID_1" from the hierarchical management table 2412, and determines a policy rule "camera rule_1" corresponding to the device type "camera" to be policy rule of the device 2 corresponding to the device ID from a contract service "default" field of the policy rule setting management table 2411. Subsequently, the policy determination unit 2433 registers the determined policy rule in the hierarchical management table 2412 in association with the device ID. Specifically, the policy determination unit 2433 registers the determined policy rule "camera rule 1" in the hierarchical management table 2412 in association with "device ID_2".

Communication Process

Next, a processing procedure of a communication method in the communication system 201 will be described. The identification information registration process of the DPI 5 in Embodiment 2 has the same processing procedure as the process illustrated in FIG. 13. Further, in the policy rule registration process of the PCRF 204, the policy rule is set and registered for each combination of the contract information and the device type from a device CLI or the external API. Further, a policy rule setting process for the device has the same processing procedure as the process illustrated in FIG. 15. The policy rule determination process (step S31 in FIG. 15) is executed according to a processing procedure illustrated in FIG. 26.

Policy Rule Determination Process

Figure 26:
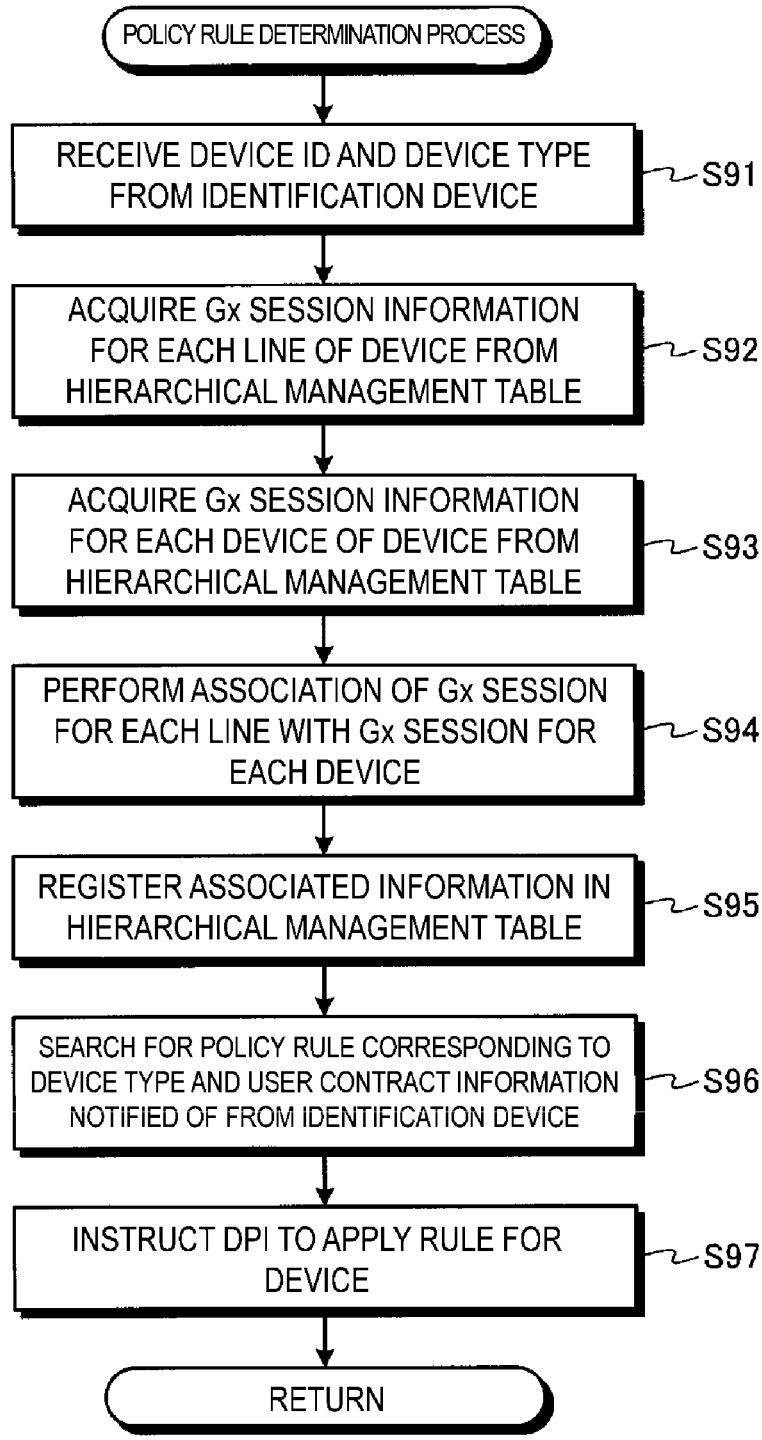
FIG. 26 is a flowchart illustrating a processing procedure of a policy rule determination process according to Embodiment 2.

FIG. 26 is a flowchart illustrating a processing procedure of a policy rule determination process according to Embodiment 2. As illustrated in FIG. 26, when the PCRF 204 receives the device ID and the device type together with the subscriber information from the identification device 3 (step S91), the PCRF 204 acquires the Gx session information for each line of the device from the hierarchical management table 2412 (step S92). The PCRF 4 acquires Gx session information for each device of the device from the hierarchical management table 2412 (step S93).

The PCRF 204 performs association of the Gx session for each line with the Gx session for each device (step S94). Subsequently, the PCRF 204 registers associated information in the hierarchical management table 2412 (step S95).

For example, the PCRF 204 registers the device ID "device ID_1" and the device type "microphone" corresponding to "session ID_3" with respect to the contract ID "contract ID_1" corresponding to a session ID that is "session ID_3" in the hierarchical management table 2412.

The PCRF 204 searches the policy rule management table 2411 for the policy rule corresponding to the device type notified of from the identification device 3 and the contract information of the user (step S96). The PCRF 204 instructs the DPI 5 to apply this policy rule as the policy rule of the corresponding device 2 (step S97). In this case, the PCRF 4 registers the policy rule applied to the device 2 in an applied policy rule field corresponding to the device ID of the device 2 in the management table.

Here, the DPI 5 associates the device ID and the NW information of the device with subscriber identification information (VLAN information in the case of a fixed type or SIM information in the case of a mobile type) and manages them using the session management table 512. This allows the PCRF 204 to associate the Gx session for each line with the Gx session for each device using the hierarchical management table 2412 and then allows the DPI 5 to establish the Gx session for each contract and the Gx session for each device with the PCRF 4.

Effects of Embodiment 2

Thus, in Embodiment 2, the same effects as those of Embodiment 1 are obtained, and different policy control depending on use can be performed for each user even when the device type is the same according to a contract status of the user. For example, in Embodiment 2, even when the same surveillance camera is used, a camera in an office is best-efforted, while priority control can also be performed in a cow fall monitoring scene.

System Configuration or Like

The respective components of the devices that have been illustrated are functional and conceptual ones, and are not necessarily physically configured as illustrated. That is, a specific form of distribution and integration of the respective devices is not limited to that which is illustrated, and all or a portion thereof can be configured to be functionally or physically distributed and integrated in any units according to various loads, use situations, and the like. Further, all or some of processing functions performed by each device may be realized by a CPU and a program that is analyzed and executed by the CPU, or may be realized as hardware based on a wired logic.

Further, all or some of the processes described as being performed automatically among the respective processes described in the embodiment can be performed manually, or all or some of the processes described as being performed manually can be performed automatically using a known method. In addition, information including the processing procedures, control procedures, specific names, and various types of data or parameters illustrated in the aforementioned literatures or drawings can be arbitrarily changed unless otherwise specified.

Program

Figure 27:
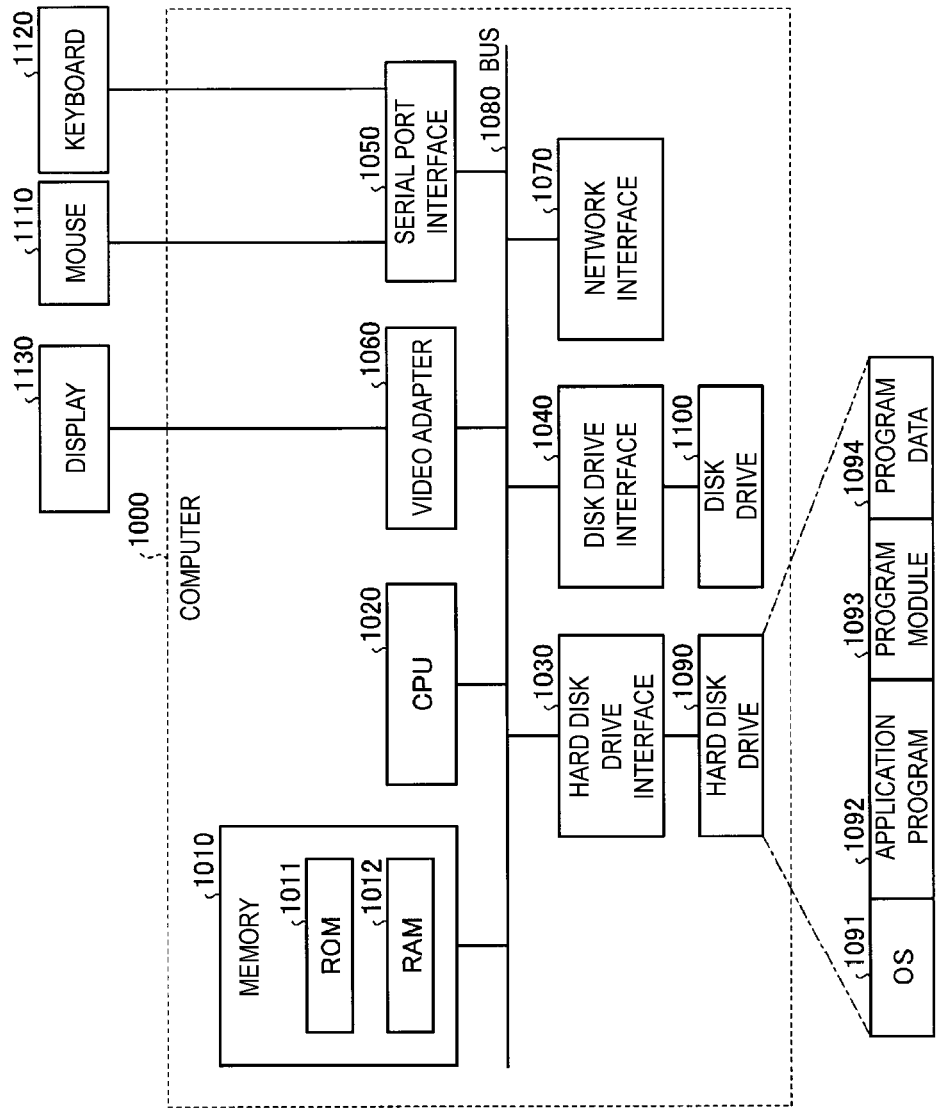
FIG. 27 is a diagram illustrating an example of a computer in which an identification device, a PCRF, and a DPI are realized by a program being executed.
Figure 28:
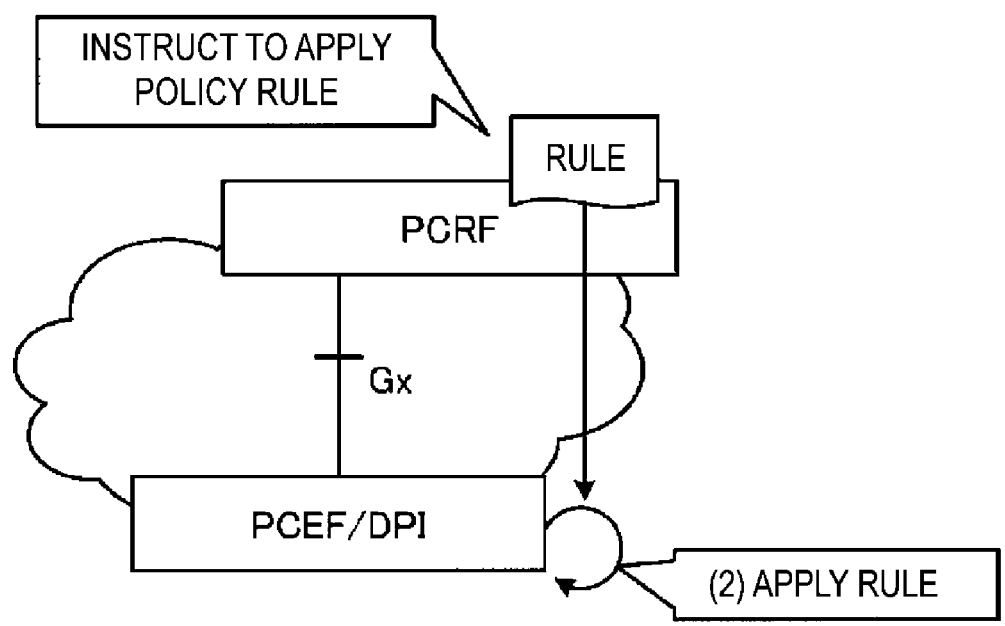
FIG. 28 is a diagram illustrating a policy rule application process according to the related art.
Figure 29:
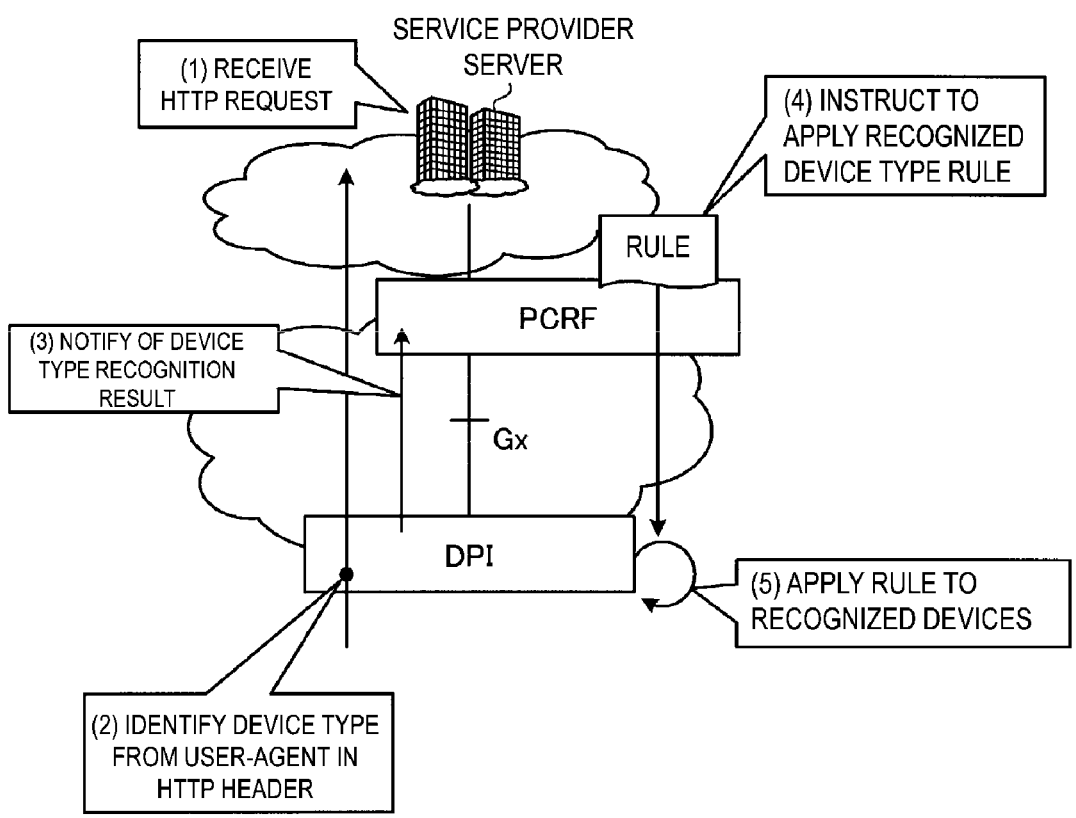
FIG. 29 is a diagram illustrating a policy rule application process according to the related art.
Figure 30:
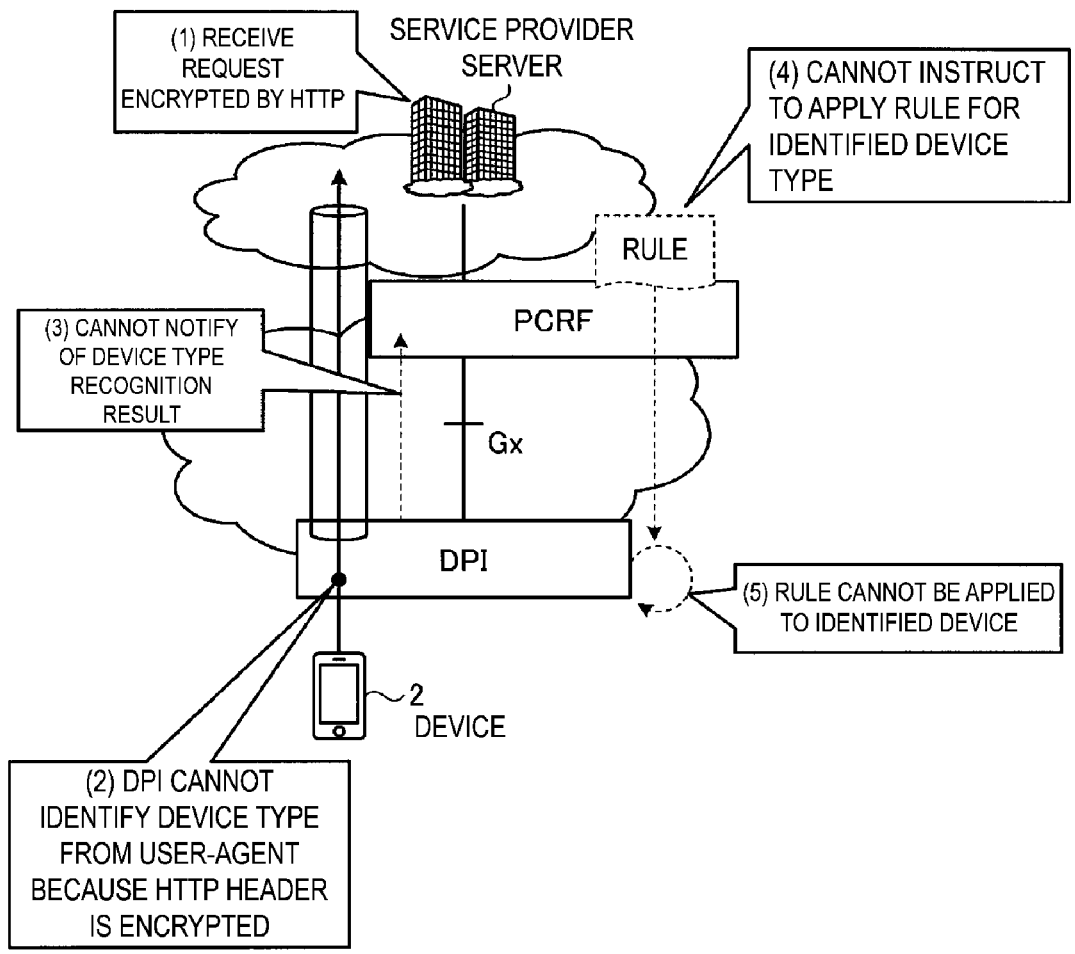
FIG. 30 is a diagram illustrating a policy rule application process according to the related art.

FIG. 27 is a diagram illustrating an example of a computer in which the identification device 3, the PCRFs 4 and 204, and the DPI 5 are realized by a program being executed. The computer 1000 includes, for example, a memory 1010 and a CPU 1020. Further, the computer 1000 includes a hard disk drive interface 1030, a disc drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disc drive interface 1040 is connected to a disc drive 1100. For example, a removable storage medium such as a magnetic disk or an optical disc is inserted into the disc drive 1100. The serial port interface 1050 is connected to a mouse 1110 and a keyboard 1120, for example. The video adapter 1060 is connected to a display 1130, for example.

The hard disk drive 1090 stores, for example, an operating system (OS) 1091, an application program 1092, a program module 1093, and program data 1094. That is, a program that defines each of processes of the identification device 3, the PCRF 4, 204, and the DPI 5 is implemented as a program module 1093 in which a computer-executable code has been described. The program module 1093 is stored in the hard disk drive 1090, for example. For example, a program module 1093 for executing the same process as a functional configuration in the identification device 3, the PCRFs 4 and 204, and the DPI 5 is stored in the hard disk drive 1090. The hard disk drive 1090 may be replaced with a solid state drive (SSD).

Further, setting data used in the process of the embodiment described above is stored as the program data 1094 in the memory 1010 or the hard disk drive 1090, for example. The CPU 1020 reads out the program module 1093 or the program data 1094 stored in the memory 1010 or the hard disk drive 1090 to the RAM 1012 as necessary and executes the program module 1093 or the program data 1094.

The program module 1093 or the program data 1094 is not limited to being stored in the hard disk drive 1090, but may be stored in, for example, a removable storage medium and read by the CPU 1020 via the disc drive 1100 or the like. Alternatively, the program module 1093 and the program data 1094 may be stored in another computer connected via a network (a local area network (LAN), a wide area network (WAN), or the like). The program module 1093 and the program data 1094 may be read by the CPU 1020 from another computer via the network interface 1070.

Although embodiments to which the invention made by the present inventor has been applied have been described above, the present invention is not limited to the description and the drawings that form part of the disclosure of the present invention according to the embodiments. That is, all other embodiments, examples, operation techniques, and the like made by those skilled in the art on the basis of the present embodiments are included in the scope of the present invention.

REFERENCE SIGNS LIST

1, 201 Communication system
2 Device
3 Identification device
4, 204 PCRF
5 DPI
10 Service provider server
31, 41, 51 Storage unit
32, 42, 52 Communication control unit
33, 43, 53 Control unit
54 Identification unit
311 Device feature quantity storage unit
312 Device ID management table
331 Identification unit
332 Notification unit
411 Policy rule management table
412 Line-specific session management table
413 Device-specific session management table
414 Subscriber information management table
431 Device type acquisition unit
432, 531 Device ID acquisition unit
433, 2433 Policy determination unit
434, 532, 3311 NW information acquisition unit
511 Policy rule setting management table
512 Session management table
2411 Policy rule management table
2412 Hierarchical management table
3312 Feature quantity extraction unit
3313 Device type determination unit
3314 Device ID assignment unit 3321 Device type notification unit
3322 Device ID notification unit
3323 NW information notification unit

The invention claimed is:

1. A communication system comprising:
an identification device, implemented with one or more processors, configured to compare a feature quantity of communication of a device with feature quantities of various other devices to identify a type of the device for assigning a unique device ID to the device based upon the identified device type of the device, wherein the feature quantity includes header information extracted from an HTTP request;
a policy control device, implemented with one or more processors, configured to provide instruction on a policy rule for controlling communication of the device based upon the identified device type; and
a relay device, implemented with one or more processors, configured to relay communication of the device according to the policy rule provided through the instruction from the policy control device,
wherein the policy control device comprises:
a first storage device configured to store a first table in which the policy rule corresponding to a combination of contract information and the device type is registered and a second table in which user information including contract information of a user and information on the device are managed in association with each other;
a first acquisition unit, implemented with one or more processors, configured to acquire the device type serving as an application target of the policy rule, and the device ID assigned to the device; and
a determination unit, implemented with one or more processors, configured to determine the policy rule according to the device type acquired by the first acquisition unit and the contract information of the user on a basis of content of the first table and the second table, and instruct the relay device to apply the determined policy rule to the device corresponding to the device ID acquired by the first acquisition unit, and
wherein the relay device comprises:
a second storage device that stores a third table in which subscriber identification information, the device ID, and network information of the device corresponding to the device ID are associated with each other;
a second acquisition unit, implemented with one or more processors, configured to acquire the device ID serving as the application target of the policy rule; and
a communication control unit, implemented with one or more processors, configured to refer to the third table, apply the policy rule provided through the instruction to communication from the device corresponding to the device ID assigned to the device to which the policy control device instructs to apply the determined policy rule, and perform control.

2. The communication system according to claim 1, wherein the communication control unit establishes a Gx session for each contract and a Gx session for each device with the policy control device.

3. A policy control device for providing instruction on a policy rule for controlling communication of a device, the policy control device comprising:
a storage device configured to store a first table in which a policy rule corresponding to a combination of contract information and a device type is registered and a second table in which user information including contract information of a user and information on the device are managed in association with each other, the device type having been previously identified for assigning a unique device ID to the device based on the identified device type of the device from a comparison of a feature quantity of communication of the device with feature quantities of various other devices, wherein the feature quantity includes header information extracted from an HTTP request;
an acquisition unit, implemented with one or more processors, configured to acquire the device type serving as an application target of the policy rule, and a device ID assigned to the device; and
a determination unit, implemented with one or more processors, configured to determine the policy rule according to the device type acquired by the acquisition unit and the contract information of the user on a basis of content of the first table and the second table, and instruct a relay device to apply the determined policy rule to the device corresponding to the device ID acquired by the acquisition unit based upon
(i) a third table comprising subscriber identification information, the device ID, and
network information of the device corresponding to the device ID associated with each other,
(ii) the device ID acquired, serving as the application target of the policy rule, and
(iii) with reference to the third table, the policy rule provided through the instruction to communication from the device corresponding to the device ID assigned to the device to which the policy control device instructs to apply the determined policy rule, and perform control.

4. The communication system according to claim 1, wherein the identification device is configured to learn statistical information based upon one or more previous Gx sessions of the device, a communication tendency of a user of the device, and a tendency of an applied policy rule.

5. The communication system according to claim 1, wherein the identification device comprises:
a third storage device configured to store the feature quantity of communication of the device obtained by receiving communications from the device; and
a control unit, implemented with one or more processors, configured to notify the policy control device and the relay device of the device type.

* * * * *